United States Patent
Moloudi et al.

(10) Patent No.: US 12,113,592 B2
(45) Date of Patent: Oct. 8, 2024

(54) CSI-BASED PRECODING IN SEARCH SPACE SUBSET

(71) Applicant: Telefonaktiebolaget LM Ericsson (publ), Stockholm (SE)

(72) Inventors: Saeedeh Moloudi, Linköping (SE); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 374 days.

(21) Appl. No.: 17/600,036

(22) PCT Filed: Jan. 31, 2020

(86) PCT No.: PCT/SE2020/050088
§ 371 (c)(1),
(2) Date: Sep. 29, 2021

(87) PCT Pub. No.: WO2020/204775
PCT Pub. Date: Oct. 8, 2020

(65) Prior Publication Data
US 2022/0190891 A1  Jun. 16, 2022

Related U.S. Application Data

(60) Provisional application No. 62/826,530, filed on Mar. 29, 2019, provisional application No. 62/826,571, (Continued)

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0639* (2013.01); *H04B 7/0695* (2013.01); *H04L 1/0038* (2013.01); *H04B 7/0626* (2013.01)

(58) Field of Classification Search
CPC ... H04B 7/04; H04B 7/06; H04B 7/08; H04B 1/71; H04B 17/30; H04B 17/24;
(Continued)

(56) References Cited

U.S. PATENT DOCUMENTS 10,355,840 B2 * 7/2019 Horiuchi ........... H04W 72/0446
10,517,074 B2 * 12/2019 Park ..................... H04L 5/0053
(Continued)

FOREIGN PATENT DOCUMENTS

CN    107294587 A    10/2017
CN    108631986 A    10/2018
(Continued)

OTHER PUBLICATIONS

Intention to Grant for European Patent Application No. 20704268.5, mailed Jun. 23, 2022, 5 pages.
(Continued)

*Primary Examiner* — Man U Phan
(74) *Attorney, Agent, or Firm* — Withrow & Terranova, PLLC

(57) ABSTRACT

Systems and methods for decoding a transmission are provided. In some embodiments, a method performed by a wireless device comprises determining a plurality of Machine-Type Communications (MTC) Physical Downlink Control Channel (MPDCCH) transmission candidates to monitor. For at least one candidate of the plurality of MPDCCH transmission candidates, the method includes determining whether the candidate belongs to a first group of candidates or a second group of candidates. If the candidate belongs to the first group of candidates, the method includes attempting to decode the MPDCCH transmission using a Channel State Information (CSI)-based precoding scheme. If the candidate belongs to the second group of candidates, the method includes attempting to decode the MPDCCH
(Continued)

transmission using a predetermined precoding scheme. This may allow a more robust precoding technique and can be considered as technique with a fallback solution for the cases in which the CSI is either missed or not reliable.

28 Claims, 19 Drawing Sheets

Related U.S. Application Data filed on Mar. 29, 2019, provisional application No. 62/842,558, filed on May 3, 2019.

(51) Int. Cl.
*H04B 7/06* (2006.01)
*H04L 1/00* (2006.01)

(58) Field of Classification Search
CPC ........... H04B 17/37; H04B 17/38; H04L 1/00; H04L 5/00; H04L 1/08; H04L 1/18; H04L 25/02; H04L 27/26; H04L 67/12; H04W 72/04; H04W 72/06; H04W 72/21; H04W 72/23; H04W 72/56; H04W 72/12; H04W 56/00; H04W 4/70; H04W 74/08; H04W 84/04; H04W 84/20; H04W 88/02; H04W 88/08
USPC ........................................................ 370/252
See application file for complete search history.

(56) References Cited

U.S. PATENT DOCUMENTS

| | | | | |
|---|---|---|---|---|
| 10,805,918 | B2* | 10/2020 | Park | H04L 12/189 |
| 10,912,070 | B2* | 2/2021 | Lin | H04W 72/23 |
| 10,966,187 | B2* | 3/2021 | Shin | H04J 11/0069 |
| 11,337,205 | B2* | 5/2022 | Lin | H04L 5/0094 |
| 11,362,779 | B2* | 6/2022 | Rico Alvarino | H04B 1/713 |
| 11,621,760 | B2* | 4/2023 | Kim | H04L 27/261 |
| | | | | 370/329 |
| 11,641,226 | B2* | 5/2023 | Bian | H04L 5/0053 |
| | | | | 375/267 |
| 2014/0050159 | A1 | 2/2014 | Frenne et al. | |
| 2016/0127097 | A1 | 5/2016 | Chen et al. | |
| 2016/0338018 | A1 | 11/2016 | Awad et al. | |
| 2018/0123741 | A1 | 5/2018 | You et al. | |
| 2018/0279101 | A1 | 9/2018 | Rico Alvarino et al. | |
| 2022/0166539 | A1* | 5/2022 | Bergman | H04L 1/08 |
| 2022/0167140 | A1* | 5/2022 | Shrestha | H04W 4/90 |
| 2022/0272513 | A1* | 8/2022 | Park | H04W 4/70 |
| 2022/0394680 | A1* | 12/2022 | Kim | H04W 48/12 |

FOREIGN PATENT DOCUMENTS

| | | |
|---|---|---|
| WO | 2008114981 A1 | 9/2008 |
| WO | 2015119559 A1 | 8/2015 |

OTHER PUBLICATIONS

Author Unknown, "Technical Specification Group Radio Access Network; Evolved Universal Terrestrial Radio Access (E-UTRA); Physical layer procedures (Release 13)," Technical Specification 36.213, Version 13.12.0, Dec. 2018, 395 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.4.0, Dec. 2018, 933 pages.
Ericsson, "R1-1901742: MPDCCH performance improvement in LTE-MTC," Third Generation Partnership Project (3GPP), TSG-RAN WG1 Meeting #96, Feb. 25-Mar. 1, 2019, 8 pages, Athens, Greece.
Ericsson, "R1-1903887: MPDCCH performance improvement in LTE-MTC," Third Generation Partnership Project (3GPP), TSG-RAN WG1 Meeting #96bis, Apr. 8-12, 2019, 12 pages, Xi'an, China.
MCC Support, "R1-190xxxx: Draft Report of 3GPP TSG RAN WG1 #96b v0.2.0," Third Generation Partnership Project (3GPP), TSG RAN WG1 Meeting #97, May 13-17, 2019, 159 pages, Reno, USA.
Qualcomm Incorporated, "R1-1902371: Usage of CRS for MPDCCH, " Third Generation Partnership Project (3GPP), TSG-TSG RAN WG1 Meeting #96, Feb. 25-Mar. 1, 2019, 4 pages, Athens, Greece.
ZTE, "R1-1901862: Discussion on MPDCCH performance improvement," Third Generation Partnership Project (3GPP), TSG RAN WG1 Meeting #96, Feb. 25-Mar. 1, 2019, 9 pages, Athens, Greece.
International Search Report and Written Opinion for International Patent Application No. PCT/SE2020/050088, mailed May 7, 2020, 27 pages.
International Preliminary Report on Patentability for International Patent Application No. PCT/SE2020/050088, mailed Feb. 12, 2021, 9 pages.
Examination Report for Indian Patent Application No. 202117045029, mailed Apr. 12, 2022, 9 pages.
First Office Action for Chinese Patent Application No. 202080038809. 7, mailed Feb. 26, 2024, 26 pages.

* cited by examiner

FIG. 4

EXAMPLE OF UE SPECIFIC SEARCH SPACE CANDIDATES FOR MONITORING MPDCCH WITH REPETITIONS IN 2 PRBS

FIG. 5

EXAMPLE OF UE SPECIFIC SEARCH SPACE CANDIDATES FOR MONITORING MPDCCH WITH REPETITIONS IN 4 PRBS

FIG. 6

EXAMPLE OF UE SPECIFIC SEARCH SPACE CANDIDATES FOR MONITORING MPDCCH WITH REPETITIONS IN 6 (4+2) PRBS

EXAMPLE OF MPDCCH TRANSMISSION OCCASIONS

MPDCCH TRANSMISSION WITH DIFFERENT REPETITION FACTORS

EXEMPLARY RESOURCE ELEMENT MAPPING FOR CRS PORTS 0, 1, 2, 3 AND DMRS PORTS 107 AND 109 IN ONE PRB PAIR

EXEMPLARY ILLUSTRATION USING A PRECODER MATRIX $W_1$ DEFINING A RELATION BETWEEN THE DMRS PORTS IN ONE PRB PAIR TO THE CRS PORTS 0-3

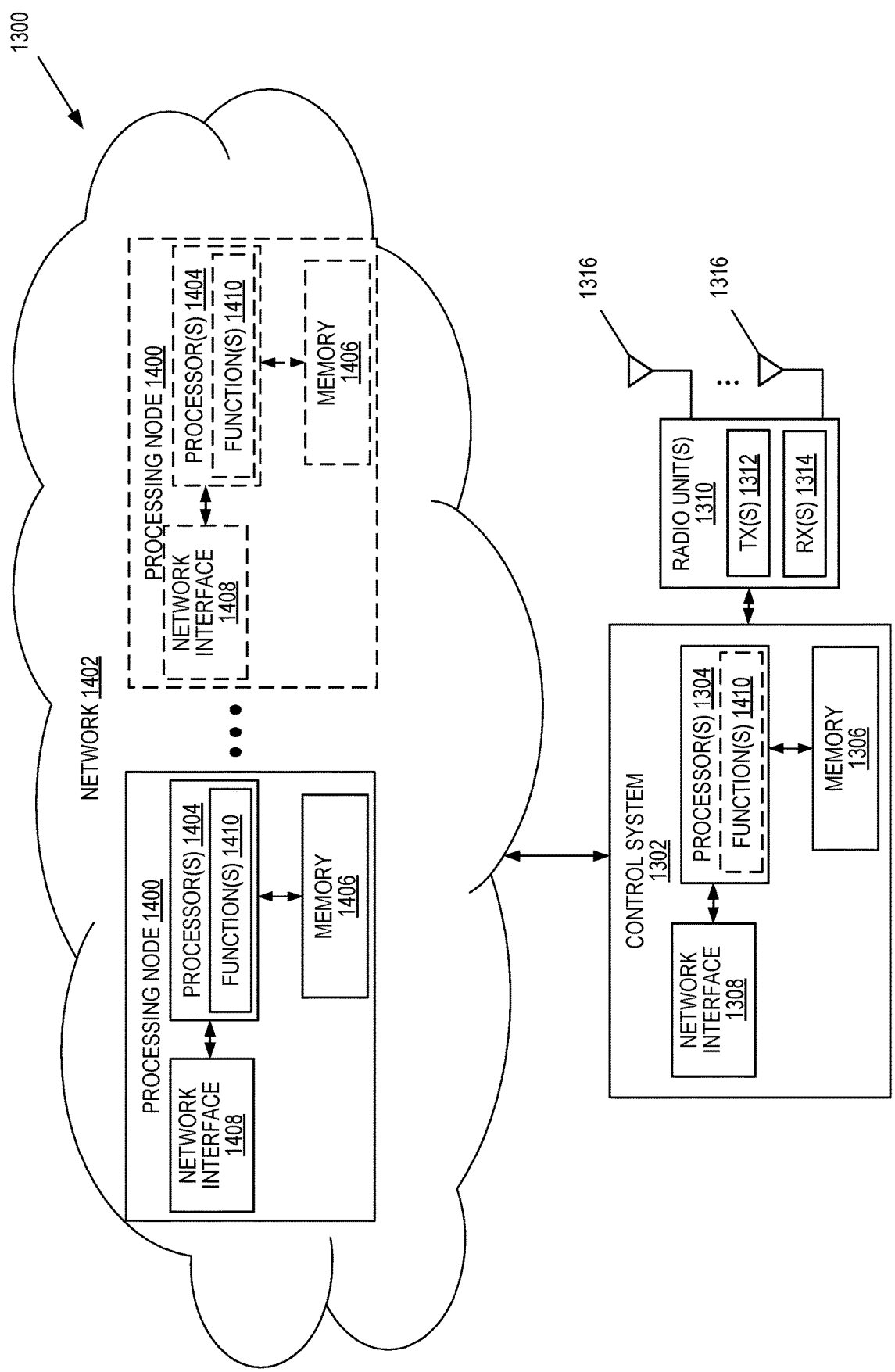

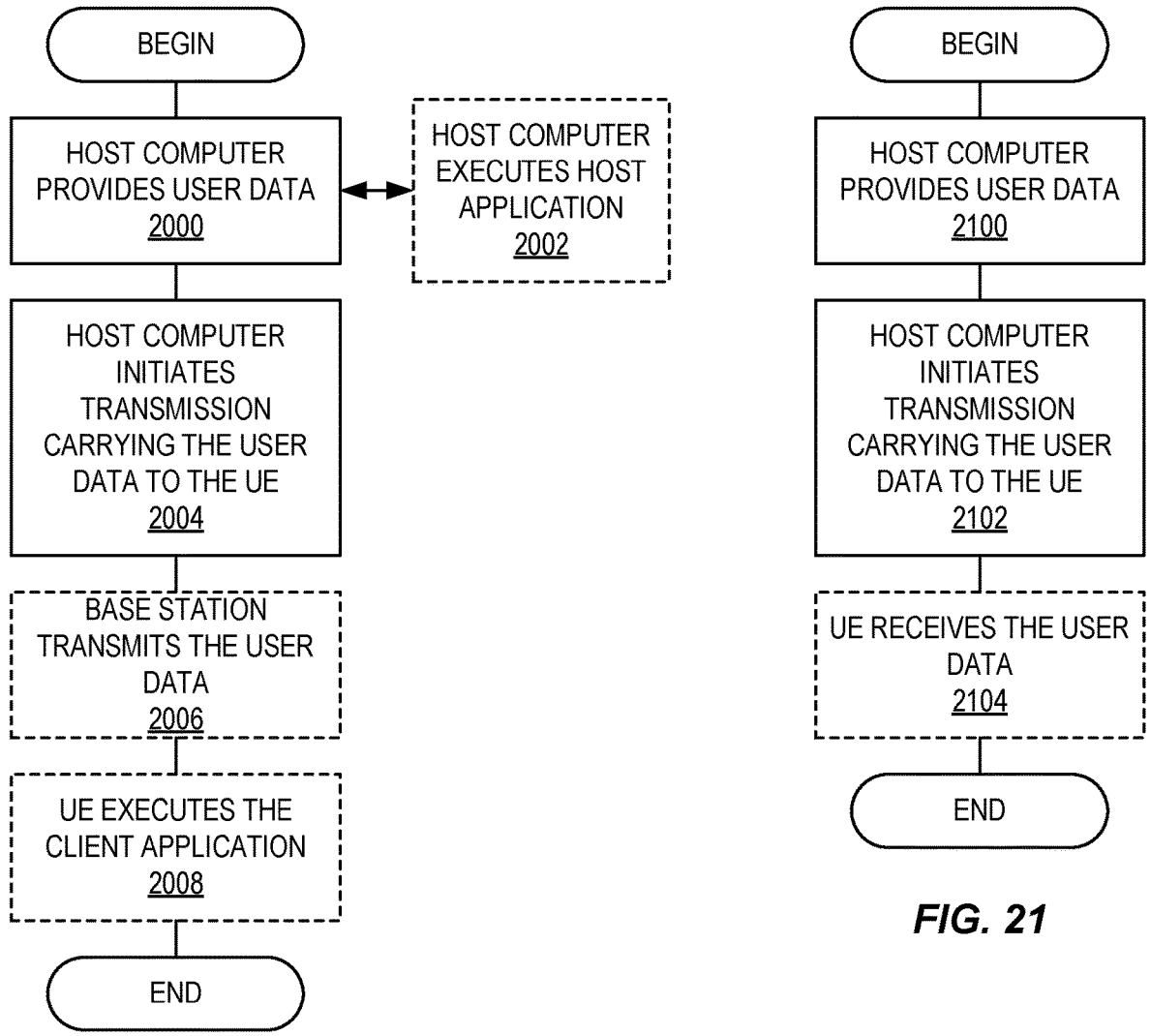

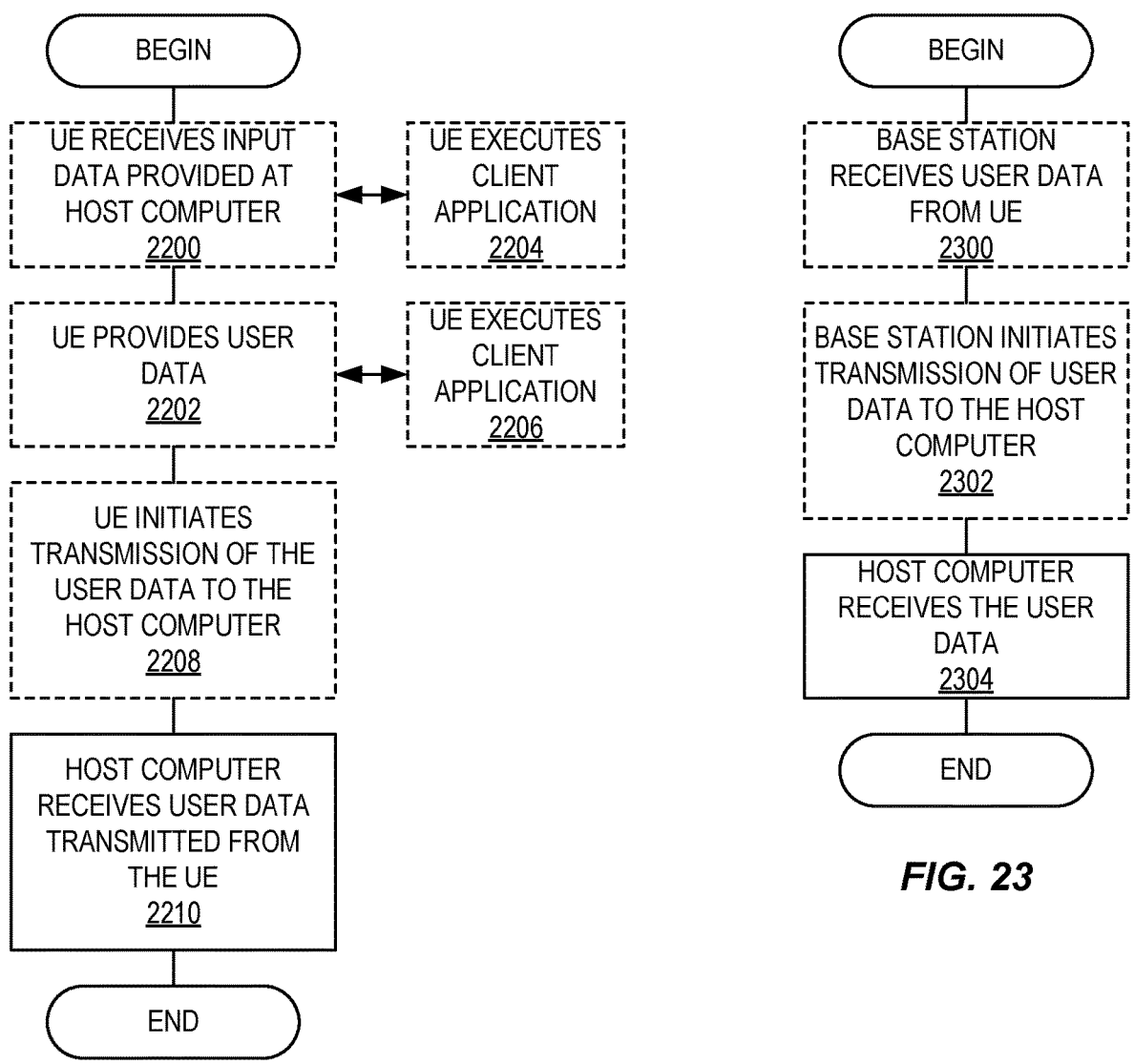

CSI-BASED PRECODING IN SEARCH SPACE SUBSET

RELATED APPLICATIONS

This application is a 35 U.S.C. § 371 national phase filing of International Application No. PCT/SE2020/050088, filed Jan. 31, 2020, which claims the benefit of provisional patent application Ser. No. 62/826,530, filed Mar. 29, 2019, and provisional patent application Ser. No. 62/826,571, filed Mar. 29, 2019, and provisional patent application Ser. No. 62/842,558, filed May 3, 2019, the disclosures of which are hereby incorporated herein by reference in their entireties.

TECHNICAL FIELD

The current disclosure relates to performing Channel State Information (CSI)-based precoding in search space subset.

BACKGROUND

There has been a lot of work in Third Generation Partnership Project (3GPP) lately on specifying technologies to cover Machine-to-Machine (M2M) and/or Internet of Things (IoT) related use cases. Most recent work for 3GPP Releases 13, 14 and 15 includes enhancements to support Machine-Type Communications (MTC) with new User Equipment (UE) categories (Cat-M1, Cat-M2), supporting reduced bandwidth of six Physical Resource Blocks (PRBs) (up to 24 PRBs for Cat-M2), and Narrowband IoT (NB-IoT) UEs providing a new radio interface (and UE categories, Cat-NB1 and Cat-NB2).

The Long Term Evolution (LTE) enhancements introduced in 3GPP Release 13, 14 and 15 for MTC are often referred to as "LTE-M", "LTE-MTC", or "eMTC" to denote the support for bandwidth limited UEs and support for coverage enhancements associated with the UE categories Cat-M1 and Cat-M2 and the corresponding functionality. In the 3GPP standardization documents, the devices complying with this functionality are also referred to as Bandwidth-reduced Low-complexity and/or Coverage Enhanced (BL/CE) UE. This is to separate discussion from NB-IoT (notation here used for any Release), although the supported features are similar on a general level.

LTE-M (as well as NB-IoT) uses many of the basic functionalities and properties of an LTE system. This includes the basic physical layer properties, including the time/frequency grid where each subcarrier and Orthogonal Frequency Division Multiplexing (OFDM) symbol corresponds to a Resource Element (RE). The grid can be divided in frequency domain into Resource Blocks (RBs), also denoted Physical Resource Blocks (PRBs), consisting of 12 subcarriers, and in time domain into slots consisting of (typically) 7 OFDM symbols and subframes consisting of 2 slots. The duration of a slot and a subframe in LTE is 0.5 ms and 1 ms, respectively. An RB or a PRB is also used to denote a group of REs spanning 12 subcarriers and 7 OFDM symbols in a slot, and a PRB pair is used to denote a group of REs spanning 12 subcarriers and 14 OFDM symbols in a subframe. An LTE UE needs to support reception and transmission over a bandwidth corresponding to up to 100 PRBs, whereas a Cat-M1 device is supposed to support only a bandwidth corresponding to 6 PRBs, which is denoted a Narrowband (NB) in the 3GPP standard.

Some of the LTE physical channels and signals are reused for LTE-M with no or only small changes to the physical layer properties. For downlink, this includes the Primary and Secondary Synchronization signals (PSS/SSS), the Cell-specific Reference Signal (CRS), the Physical Broadcast Channel (PBCH) and the Physical Downlink Shared Channel (PDSCH) used for data transmissions. It was possible to reuse these for LTE-M since they can be received within a bandwidth of only 6 PRBs. However, it was necessary to introduce other changes in order to accommodate the particular limitations and/or desired features of communication using LTE-M devices. One such change relates to the downlink control information (DCI), which in LTE is transmitted on a Physical Downlink Control Channel (PDCCH). Since PDCCH in LTE spans the whole system bandwidth transmitted from a base station (also referred to as an eNodeB or eNB) an LTE-M UE cannot be required to receive this. Therefore, a new control channel, MTC Physical Downlink Control Channel (MPDCCH) was introduced in Release 13, largely based on the Enhanced Physical Downlink Control Channel (EPDCCH) defined in LTE Release 11.

Another desired feature in Release 13 was to support enhanced coverage for IoT devices. This was largely achieved by introducing repetitions of the physical channels by means of explicitly repeating transmission of a particular data or control packet in subsequent subframes, and/or by allowing a receiver to accumulate subsequent (legacy) transmissions of channels and signals. The former includes control and data transmissions on a Machine-Type Communications (MTC) Physical Downlink Control Channel (MPDCCH) and PDSCH, respectively, whereas the latter also includes signals that were transmitted repeatedly already in legacy LTE, such as PSS, SSS and PBCH. By repeating transmission and reception of the same packet, the LTE-M receiver is able to combine information from these transmissions in order to achieve good enough accumulated signal-to-noise ratio (SNR) to successfully demodulate and decode the received packet, also in bad coverage conditions. In order to differentiate between LTE-M devices in need for different amount of coverage enhancement techniques, two different Coverage Enhancement modes have been defined, CE Mode A and CE Mode B, respectively. Devices in need for no or only small coverage enhancement are typically configured in CE Mode A, whereas devices in bad coverage that need more substantial coverage enhancement, e.g., more repetitions of physical channels, are configured in CE Mode B.

An LTE-M UE can be configured to monitor MPDCCH transmissions within 2, 4, or 6 PRB pairs adjacent in frequency. A particular control message is transmitted by the eNB in one out of a limited number of possible locations corresponding to a subset of the resource elements within these configured PRB pairs. An LTE-M UE monitors and attempts to blindly decode MPDCCH candidates in a so called search space, which comprises a well-defined subset of these possible locations. There are Common Search Spaces (CSS), known to all (LTE-M) UEs where primarily common control messages are transmitted, such as MPDCCH transmissions related to paging or random-access. There are also UE specific Search Spaces (USS), used for scheduling dedicated data transmissions in downlink on PDSCH or uplink on the Physical Uplink Shared Channel (PUSCH).

When the UE monitors MPDCCH in a particular search space, it does so by trying to decode a number of MPDCCH candidates using one or more particular Radio Network Temporary Identifiers (RNTIs). A particular RNTI is associated with a bitmap which is used to scramble the Cyclic Redundancy Check (CRC) of the MPDCCH candidate, so that the UE is intended to successfully decode the MPDCCH only if it applies the RNTI with which the MPDDCH was transmitted. There are different RNTIs used for different purposes, where primarily a dedicated RNTI will be considered herein. Without limitation, we assume that the Cell RNTI (C-RNTI) is used, where the C-RNTI is unique for each UE in connected mode in the serving cell. A UE in connected mode and configured in CE Mode A is required to monitor MPDCCH candidates scrambled with C-RNTI both in the UE-specific search space, USS, and the Type0-MPDCCH common search space, herein abbreviated CSS-0 for the sake of brevity.

Furthermore, an MPDCCH candidate may consist of different numbers of resource elements to achieve different code rates. This is referred to as different Aggregation Levels (ALs), where the set of allowed ALs for MPDCCH is {1, 2, 4, 8, 16, 24}, where the aggregation level refers to the number of Enhanced Control Channel Elements (ECCEs) used for the MPDCCH candidate. Each ECCE is a set of REs corresponding to the number of REs contained in approximately ¼ PRB, which means that the allowed ALs for the MPDCCH candidate occupy REs corresponding to (approximately) {¼, ½, 1, 2, 4, 6} PRB pairs.

Before attempting to decode an MPDCCH message, the LTE-M UE first receives reference signals located in specific resource elements in order to estimate the propagation channel between the transmitting eNB and the UE. For MPDCCH transmission, Demodulation Reference Signals (DM-RS) are used, which will be described in more detail below.

The eNB may further use one of two different transmission modes to transmit an MPDCCH message, denoted localized and distributed mode, respectively. In short, the different modes refer to what REs are used for a particular MPDCCH candidate, and how the data transmitted on these REs are related to the corresponding DM-RS. Localized transmission uses REs in as few PRBs pairs as possible (i.e., only one PRB pair for aggregation levels up to 4), whereas distributed transmission uses REs in all PRB pairs which the UE is configured to monitor MPDCCH in. The relation between transmission mode and use of DM-RS is further discussed below.

Reference signals, or pilot signals, are transmitted in communication systems in order to provide a phase reference that a receiver can use in order to synchronize the timing of the transmission and adjust for any frequency error between the transmitter and receiver. In most communication systems, reference signals are also used to provide a phase reference such that the receiver can estimate the propagation channel between the transmitter and the receiver in order to be able to demodulate and decode the transmitted data message. In cellular systems, reference signals transmitted in a cell from a base station to a UE can be classified as either common or dedicated reference signals. Common (often referred to as cell-specific) reference signals are intended to be used by all UEs communicating with the cell and are typically broadcast with equal power in all directions within the cell, whereas dedicated (often referred to as user-specific) reference signals are intended to be received and used by one user only. Throughout this disclosure, LTE will be used as an exemplary cellular system, but the ideas presented herein apply to any communication system with different classes of reference signals with properties that can be mapped to those described.

In LTE, different types of common reference signals exist, of which the so called Cell-specific Reference Signal (CRS), is the most important type. It is transmitted in (almost) all subframes and is mainly used to support channel estimation in order to demodulate the different physical control and data channels, but it is also used for e.g., measuring signal strength and quality on own and neighboring cells. Furthermore, two types of dedicated reference signal exist, so called Demodulation reference signals (DM-RS) for the Physical Downlink Shared Channel (PDSCH) and the Enhanced Physical Downlink Control Channel (EPDCCH), respectively. The latter is also used as demodulation reference signal for the MPDCCH.

Each type of reference signal can be transmitted from so called antenna ports, which can be seen as logical antennas. Each antenna port can then be mapped to one or more physical antenna. In order to support multi-antenna transmission schemes such as transmit diversity and Multiple-Input Multiple-Output (MIMO) each type of reference signal can be transmitted from several antenna ports. Each antenna port is mapped to a fixed set of Resource Elements (RE) in the Orthogonal Frequency Division Multiple Access (OFDMA) physical layer time-frequency grid, and the reference symbols sent on each one of these REs are defined in the standard.

Furthermore, several different transmission modes for data transmission on PDSCH have been defined in LTE. In the first LTE release, the focus was on transmission modes using the CRS for demodulation. The CRS symbols are used by the UE, among other things, to perform estimation of the propagation channel from each TX antenna port in the eNB to each RX antenna in the UE. The CRSs are transmitted on antenna ports p=0, p∈{0, 1} or p∈{0, 1, 2, 3} depending on if 1, 2, or 4 antenna port transmissions are configured. In order to optimize the SNR for data transmission in multi-antenna transmission schemes, the data symbols to be transmitted can be multiplied with a precoding vector or matrix. For TX diversity, a precoding vector typically aims at rotating the phases of the signals from the TX antennas such that the signals add constructively at the RX antennas in the UE, thereby achieving a beamforming gain. Similarly, a precoding matrix aims at maximizing the spatial multiplexing gain for MIMO transmission. However, since the CRS symbols are common to all users in a cell, these cannot be precoded for a specific user. Instead, the precoder used for data transmission is signaled to the UE so that it can undo the precoding when reconstructing the transmitted data symbols. The eNB is informed by the UE about the preferred precoder, selected from a codebook of possible precoders, based on measurements of the propagation channel.

When using user-specific reference signals, such as the DM-RS, the eNB may perform the phase rotations to improve beamforming and spatial multiplexing gains both on the reference signals and the data symbols. This implies that the UE can perform channel estimation and demodulate the data signal without knowing what precoder has actually been used by the eNB. The eNB is furthermore not restricted to use only the precoders defined in the codebooks and may also change precoders each subframe. This makes it possible, at least in theory, to adapt the transmissions in a more agile way in order to maximize the link-level performance, also in scenarios with rapidly changing propagation channels. Still, the eNB may typically need some assistance from UE measurements in order to know good precoder selections, and imperfections in this procedure may reduce the overall performance.

As mentioned earlier, user-specific reference signals can be used both with certain transmission modes of the data channel PDSCH, and with the Enhanced Physical Control Channel EPDCCH and the MTC Physical Control Channel MPDCCH. The DM-RSs for PDSCH are transmitted on antenna ports p=5, p=7, p=8 or one or several of p∈{7 . . . 14}. The DM-RS for EPDCCH and MPDCCH are transmitted on one or several of p∈{107 . . . 110}.

As mentioned above, for MPDCCHs up to LTE Rel-15, similar to other transmission channels, the choice of precoder is considered to be transparent to the UE. I.e., it is up to the eNB to select the precoder without informing the UE, though the UE may make some assumptions on e.g., how often the precoder may vary in time and/or frequency.

However, there is a Rel-16 work item where one of the objectives aims at improving the MPDCCH performance. One of the factors that may limit the performance in earlier releases is the quality of the channel estimation. One of the reasons for this is the fact that the UE can make no or very few assumptions on the used precoder. It has been concluded that the channel estimation performance may be improved by using the CRS in addition to the DM-RS for MPDCCH. In order to do so, there is a need for the UE to know the exact relation between the CRS and DM-RS, i.e., to know the precoder used by the eNB for transmitting the MPDCCH and its associated DM-RS. Therefore, it is important that eNB selects and changes the precoder in a deterministic manner which is also known by the UE. This was addressed in an earlier patent application (International Application No. PCT/SE2015/050080) hereby incorporated herein by reference.

There are several methods that the precoder matrix selection can be based on.

In one alternative, the network can simply use a constant precoder for transmission of the MPDCCH symbols. But, in this way, the transmission SNR can only be optimized for a limited set of channel realizations. For localized transmission in particular, to ensure that it is possible to find a precoder that matches the current channel conditions, in the so-called closed-loop precoding, the network can select a particular precoder based on the feedback of the Channel-State Information (CSI) from the UE.

In another alternative, the network can select and change the precoder independently from the channel. For example, based on agreements made at RAN1 #95, the network can use some precoding cycling across time and/or frequency domain. This cycling may be employed over the full codebook defined in LTE Rel-8, or over a subset of the precoder matrices. For MPDCCH, the coverage improves via repeated transmission. Therefore, the precoder cycling allows the network to transmit an MPDCCH packet and its repetitions with different precoders, which consequently increases the chance of selecting a precoder that matches the current channel conditions more closely.

When CSI-based precoding is used, the UE reports a preferred precoder in terms of a Precoder-Matrix Indicator (PMI). The UE determines this preferred PMI by estimating which one, among a given set of precoders, would result in best performance for reception of transmissions from the network node to the UE. The UE typically estimates a metric representing this performance, and tries to find the PMI which optimizes this metric. One example of such a metric is a combined received SNR for different PMIs. Alternative metrics for reception of a downlink (DL) data channel include an estimated achievable data throughput for different choices of PMI. For reception of a DL control channel, the metric may be selected as an estimated Block-Error Rate (BLER) for a given transmission format of the control channel.

In a typical scenario, the network node configures the UE to send periodic CSI reports at specified time instants with the preferred PMI. The network will then typically use the reported PMI for subsequent DL transmissions until the next CSI report is received. In other scenarios, aperiodic CSI reporting is used, in which case the CSI report is triggered by the network in terms of, e.g., a specific DCI on a downlink control channel.

There currently exist certain challenges. As such, improved systems and methods for CSI-based precoding are needed.

SUMMARY

Systems and methods for decoding a transmission are provided. In some embodiments, a method performed by a wireless device comprises determining a plurality of Machine-Type Communications (MTC) Physical Downlink Control Channel (MPDCCH) transmission candidates to monitor. For at least one candidate of the plurality of MPDCCH transmission candidates, the method includes determining whether the candidate belongs to a first group of candidates or a second group of candidates. The first group of candidates comprises a first subset of a first search space and the second group of candidates comprises the combination of a second search space and a second subset of the first search space. The second subset is the complement of the first subset and the first search space comprises a User Equipment (UE)-specific search space and the second search space comprises a Type 0-MPDCCH common search space. If the candidate belongs to the first group of candidates, the method includes attempting to decode the MPDCCH transmission using a Channel State Information (CSI)-based precoding scheme. If the candidate belongs to the second group of candidates, the method includes attempting to decode the MPDCCH transmission using a predetermined precoding scheme. This may allow a more robust precoding technique and can be considered as technique with a fallback solution for the cases in which the CSI is either missed or not reliable.

In some embodiments, the predetermined precoding scheme is chosen from the group consisting of: selecting the precoder based on precoder cycling; and selecting a fixed precoder.

In some embodiments, determining whether the candidate belongs to the first group of candidates or the second group of candidates is based on an aggregation level (L) of the control channel candidate.

In some embodiments, determining whether the candidate belongs to the first group of candidates or the second group of candidates is based on one or more of the group consisting of: an aggregation level (L) of the control channel candidate; an index (m) identifying the control channel candidate for an aggregation level within the search space; a time repetition factor (R) of the control channel candidate; a sequential index (u) identifying a starting subframe of a the control channel candidate for a given repetition factor; a time index identifying a time reference of the control channel candidate; a time index identifying a time reference of the search space; and a number of physical resource blocks used for monitoring control channel candidates within the search space.

In some embodiments, using a CSI-based precoding scheme comprises using a single precoding matrix to be used for all physical resource blocks used for transmitting the control channel candidate.

In some embodiments, using a CSI-based precoding scheme comprises using a plurality of precoding matrices, each precoding matrix to be used for a subset of the physical resource blocks used for transmitting the control channel candidate. In some embodiments, the subset of the physical resource blocks belongs to different narrowbands when the control channel candidate is transmitted using frequency hopping.

In some embodiments, frequency hopping between at least two different narrowbands is employed, and one precoding scheme is used in one of the narrowbands and a different precoding scheme is used in at least one other narrowband.

In some embodiments, using a predetermined precoding scheme comprises using a plurality of precoding matrices when the precoding technique is based on precoder cycling. In some embodiments, the precoder used varies according to a predetermined pattern in time and/or frequency.

In some embodiments, using a CSI-based precoding scheme comprises using a precoder based on channel state information sent by the wireless device. In some embodiments, the channel state information comprises a Precoding Matrix Indicator (PMI).

In some embodiments, the method also includes using the determined precoder being used in a Physical Resource Block (PRB) pair for obtaining channel estimates associated with the antenna ports used for transmission in the PRB pair by performing channel estimation based on a combination of the Demodulation Reference Signal (DM-RS) located in the PRB pair and at least one of the DM-RS located in one or more other PRB pairs, and Cell Specific Reference Signal (CRS) located in any set of PRB pairs.

In some embodiments, the method also includes using the determined precoder being used in a PRB pair for obtaining channel estimates associated with the antenna ports used for transmission in another PRB pair by performing channel estimation based on a combination of the DM-RS located in the PRB pair and at least one of the DM-RS located in one or more other PRB pairs, and CRS located in any set of PRB pairs.

In some embodiments, the method also includes using the determined precoder being used in a PRB pair for obtaining channel estimates associated with the antenna ports used for transmission in the PRB pair by performing channel estimation based on CRS located in any set of PRB pairs.

In some embodiments, the method also includes using the obtained channel estimates associated with the antenna ports used for transmission in one or more PRB pair to demodulate information received in the PRB pairs. In some embodiments, the information is associated with the MPDCCH or a Physical Downlink Shared Channel, PDSCH In some embodiments, a method performed by a base station for encoding a transmission includes determining whether to encode a MPDCCH transmission to a wireless device using a CSI-based precoding scheme or a predetermined precoding scheme. If using the CSI-based precoding scheme, the method includes choosing a candidate for transmission from a first group of candidates where the first group of candidates comprises a first subset of a first search space and the first search space comprises a UE-specific search space. If using the predetermined precoding scheme, the method includes choosing a candidate for transmission from a second group of candidates where the second group of candidates comprises the combination of a second search space and a second subset of the first search space, where the second subset is the complement of the first subset and the second search space comprises a Type 0-MPDCCH common search space.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 4-6 depict UE specific Search Spaces (USS) candidates using different aggregation levels, according to some embodiments of the present disclosure;

FIG. 14 is a schematic block diagram that illustrates a virtualized embodiment of the radio access node according to some embodiments of the present disclosure;

FIG. 20 is a flowchart illustrating a method implemented in a communication system according to some embodiments of the present disclosure; and FIGS. 21-23 are flowcharts illustrating methods implemented in a communication system according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
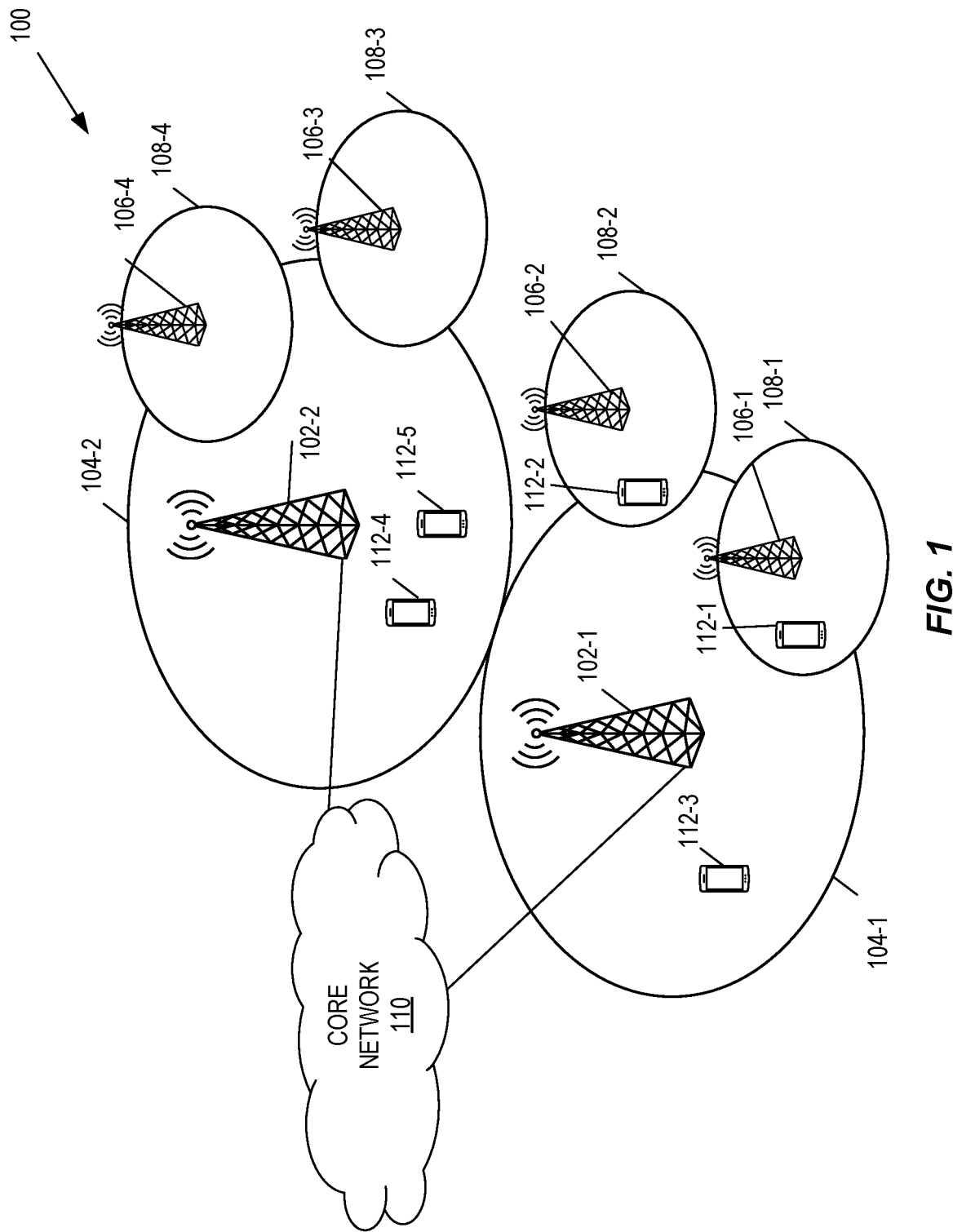
FIG. 1 illustrates one example of a cellular communications network, according to some embodiments of the present disclosure.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

There currently exist certain challenges. Although, by knowing channel condition, the CSI-based precoding shows better performance than a predefined precoding method, this method may be ineffective due to some reliability issues. For example, the CSI may be missed or decoded incorrectly at the eNB side. If the UE has transmitted a preferred PMI, the UE would normally expect the eNB to use this PMI in subsequent transmissions, but when the CSI report is not correctly received, the eNB does not know which Precoding Matrix Indicator (PMI) the UE expects to be used. In particular, when the reported PMI is intended to be used for the downlink control channel, such as the MPDCCH, there is currently no fallback solution. As such, improved systems and methods for CSI-based precoding are needed.

Figure 2:
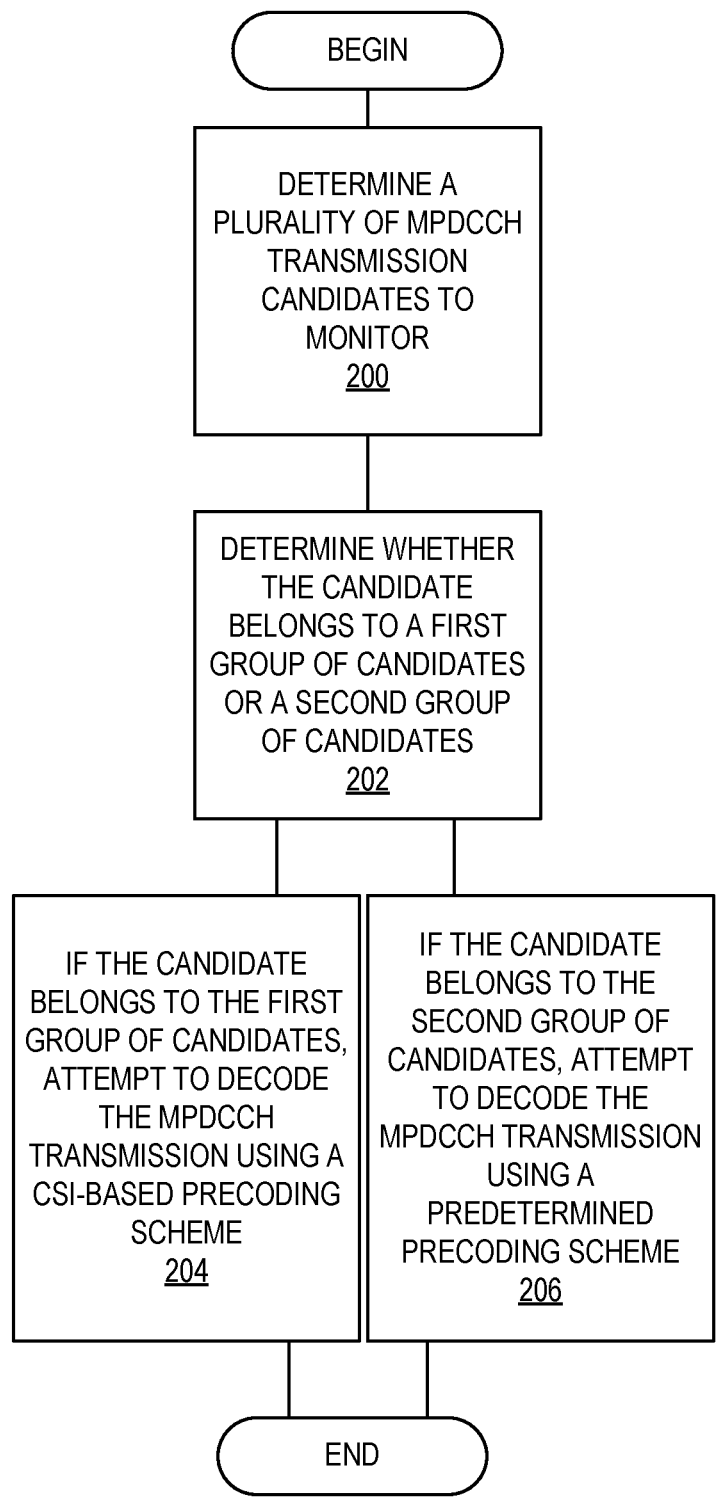
FIG. 2 illustrates a method performed by a wireless device for decoding a transmission, according to some embodiments of the present disclosure.

Systems and methods for decoding a transmission are provided. FIG. 2 illustrates a method performed by a wireless device for decoding a transmission, according to some embodiments of the present disclosure. In some embodiments, the method comprises determining a plurality of Machine-Type Communications (MTC) Physical Downlink Control Channel (MPDCCH) transmission candidates to monitor (step 200). For at least one candidate of the plurality of MPDCCH transmission candidates, the method includes determining whether the candidate belongs to a first group of candidates or a second group of candidates (step 202). The first group of candidates comprises a first subset of a first search space and the second group of candidates comprises the combination of a second search space and a second subset of the first search space. The second subset is the complement of the first subset. The first search space comprises a User Equipment (UE)-specific search space, and the second search space comprises a Type 0-MPDCCH common search space. If the candidate belongs to the first group of candidates, the method includes attempting to decode the MPDCCH transmission using a Channel State Information (CSI)-based precoding scheme (step 204). If the candidate belongs to the second group of candidates, the method includes attempting to decode the MPDCCH transmission using a predetermined precoding scheme (step 206). This may allow a more robust precoding technique and can be considered as technique with a fallback solution for the cases in which the CSI is either missed or not reliable.

It is noted herein that MPDCCH transmissions are sent from the network/base station to the wireless device.

Figure 3:
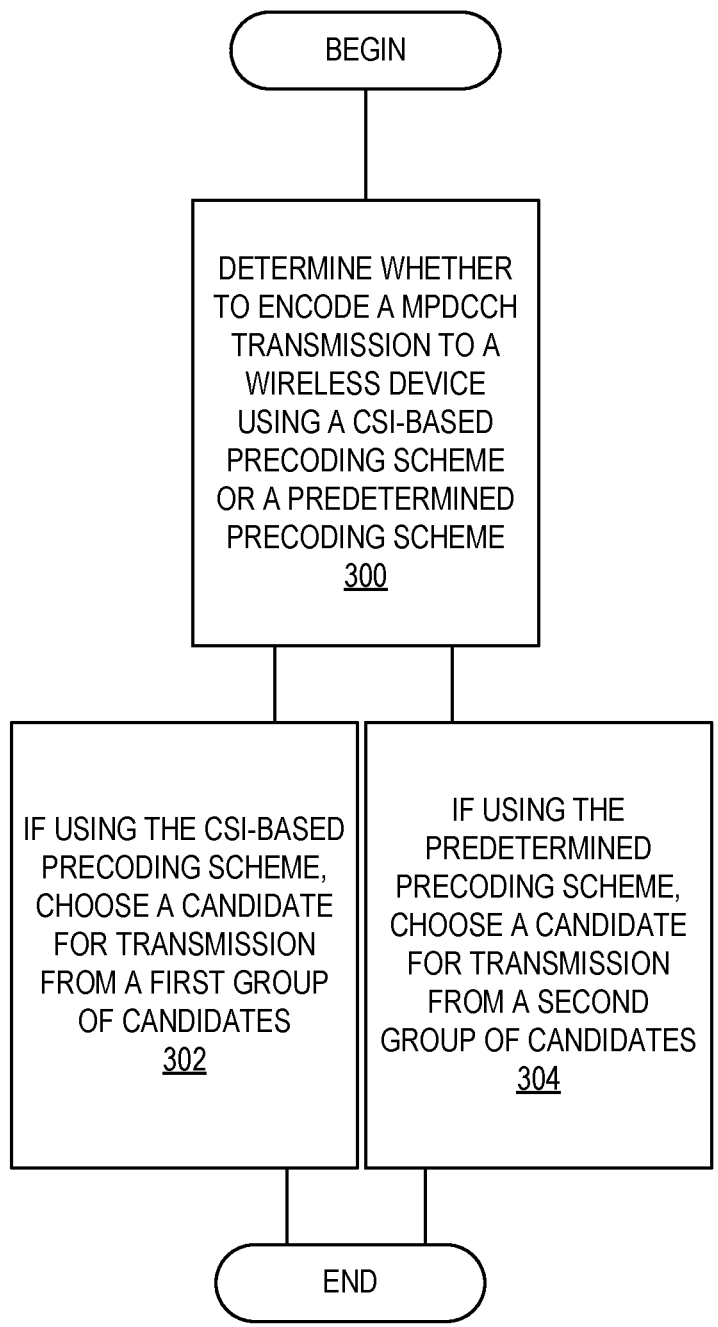
FIG. 3 illustrates a method performed by a base station for encoding a transmission, according to some embodiments of the present disclosure.

FIG. 3 illustrates a method performed by a base station for encoding a transmission, according to some embodiments of the present disclosure. In some embodiments, determining whether to encode a MPDCCH transmission to a wireless device using a CSI-based precoding scheme or a predetermined precoding scheme (step 300). If using the CSI-based precoding scheme, the method includes choosing a candidate for transmission from a first group of candidates where the first group of candidates comprises a first subset of a first search space and the first search space comprises a UE-specific search space (step 302). If using the predetermined precoding scheme, the method includes choosing a candidate for transmission from a second group of candidates where the second group of candidates comprises the combination of a second search space and a second subset of the first search space, where the second subset is the complement of the first subset and the second search space comprises a Type 0-MPDCCH common search space (step 304). In some embodiments, the base station may decide to use the predetermined precoding scheme, for example, if a CSI has not been received from the wireless device, or if a received CSI is deemed by the base station not to be reliable. In some embodiments, the CSI may be deemed unreliable if, for example, the communication with the wireless device is operating in bad coverage, in which the estimation of a preferred precoder is more likely to be erroneously determined.

Some embodiments of the current disclosure partition the MPDCCH search spaces into two groups; one group $G_1$ for which CSI-based precoding is used, and one group $G_2$ for which a predetermined precoding scheme is used. A typical example of the predetermined precoding scheme would be to use some kind of precoder cycling, where the precoder used varies according to a predetermined pattern in time and/or frequency. This will be used throughout this description as the default example of the predetermined precoding scheme to be used as a fallback, but any other predetermined precoding scheme can be used in its place.

Since CSI-based precoding naturally relates to unicast transmission from one base station to one UE, this scenario is particularly considered in the description below. However, the idea can be used for any scenario in which CSI-based precoding is meaningful. A UE in connected mode and configured in CE Mode A is required to monitor MPDCCH candidates using the Cell RNTI (C-RNTI) both in one UE-specific search space USS and one Type0-MPDCCH common search space, herein abbreviated CSS-0 for the sake of brevity. The two search spaces are monitored within the same set of 2, 4, or 6 PRBs. This case is therefore the focus of the disclosure.

In a first embodiment, CSI-based precoding is used for MPDCCH candidates transmitted in the UE-specific search space, USS, and precoder cycling is used for MPDCCH candidates transmitted in the Type0-MPDCCH common search space, CSS-0.

One particular advantage of providing a fallback scheme is that there is a high likelihood that communication can be maintained with the device even when the CSI report is not correctly received.

In one embodiment, an MPDCCH candidate is further transmitted in CSS-0 after failure to receive a CSI report, where the MPDCCH contains a trigger for an aperiodic CSI report. This way, the UE will get a second chance to provide a preferred PMI to the eNB which can then, upon successful detection, be used in MPDCCH transmissions in the USS henceforth until the next (periodic or aperiodic) CSI report is scheduled.

This first embodiment and variants thereof will now be described by discussing properties of the MPDCCH search spaces.

The definition of the MPDCCH search spaces can be found in 3GPP TS36.213, v13.12.0, Section 9.1.5, and some of the features relevant for this current disclosure are described herein. The UE-specific search space is defined in terms of a number of MPDCCH candidates to monitor within a configured set of 2, 4, or 6 PRBs. In cases where the UE is configured to monitor MPDCCH in localized mode, and without any repetitions in CE Mode A, the number of candidates to monitor for different aggregation levels is given by Table 1. In this case, it can be noted that the UE needs to monitor all possible candidates in USS, since the number of candidates always matches the maximum possible candidates for combinations of aggregation level L and number of PRBs. For example, if the UE is configured to monitor MPDCCH candidates in 4 PRBs, there are in total 8+4+2+1=15 candidates in USS in each applicable subframe.

TABLE 1

| PRBs to monitor | Number of MPDCCH candidates in USS in localized mode without MPDCCH repetitions in CE Mode A | | | |
| --- | --- | --- | --- | --- |
| | Number of EPDCCH candidates $M_p^L$ | | | |
| | L = 2 | L = 4 | L = 8 | L = 16 |
| 2 | 4 | 2 | 1 | 0 |
| 4 | 8 | 4 | 2 | 1 |

In contrast to the USS, CSS-0 contains only candidates with the maximum aggregation level for the monitored set of PRBs. Hence, the CSS-0 candidate uses aggregation level 8 or 16 depending on if the MPDCCH candidate is monitored within 2 or 4 PRBs, respectively. Since CSS-0 only uses the maximum aggregation level, corresponding to the lowest possible code rate, it can be expected to have a lower BLER performance than when using other aggregation levels, which makes it well suited to be used as a fallback solution. This includes the case addressed in this current disclosure, namely as a fallback solution when CSI-based precoding fails, e.g., due to a missed CSI report.

It can be noted that USS and CSS-0 are constructed in largely similar ways, including the fact that the UE is required to monitor MPDCCH candidates using maximum aggregation level in both search spaces. Furthermore, if a UE manages to detect an MPDCCH candidate using C-RNTI for the maximum aggregation level, it cannot determine unambiguously if the candidate was transmitted in USS or CSS-0. However, when different precoding techniques are used in the two search spaces, there is a much higher probability that the UE successfully decodes the MPDCCH when assuming the precoder associated with the respective search space.

The first embodiment can be extended and varied in several ways. In one such embodiment, the MPDCCH candidates associated with precoder cycling also include some of the candidates of USS in addition to CSS-0. A motivation for this is to allow cycling also for candidates with lower aggregation level, i.e., higher code rate. This can be useful in cases where the network may assume that the radio propagation conditions are good enough, such that the highest aggregation level may be avoided. This has the advantage that MPDCCHs to different UEs can be multiplexed within the same PRBs, which is not possible when CSS-0 is used, since the full PRBs are occupied with one MPDCCH using the maximum aggregation level.

There are several ways in which this embodiment can be realized by associating one or more of the USS candidates with precoder cycling. FIG. 4 and FIG. 5 depict USS candidates using different aggregation levels when MPDCCH monitoring is done in 2 or 4 PRBs, respectively. The different MPDCCH candidates can be parameterized with pairs $(L,m)_N$, where m can assume values between 0 and $M_p^L-1$, where $M_p^L$ is the number of candidates to monitor for the particular aggregation level L and number of PRBs N, as given by Table 1. In a non-limiting example, MPDCCH candidates in USS with m as an even number can be associated with CSI-based precoding, whereas odd numbers can be associated with precoder cycling. However, the partitioning of the USS candidates between CSI-based precoding and precoder cycling can be done in many other fashions. In typical embodiments, at least one candidate for each aggregation level in USS remains to be associated with the CSI-based precoding, in particular the candidate with the maximum aggregation level, since the corresponding CSS-0 candidate has already been assigned to precoder cycling according to the first embodiment.

The search space example used above referred to the case of localized transmission mode without MPDCCH repetitions. In case the UE is configured to monitor MPDCCH in CE Mode A with repetitions, the number of candidates in USS is given by Table 2 and Table 3, where the former is applicable when the UE is configured to monitor MPDCCH in two or four PRBs, and the latter when the UE is configured to monitor MPDCCH in six PRBs. In addition to the aggregation level L, the tables also include a repetition factor R which may assume up to four different values, r1 to r4. The network configures a maximum number of MPDCCH repetitions $r_{max}$, which may assume any value {2, 4, 8, . . . , 256}. As one non-limiting example, if $r_{max}=16$, the values r1 to r4 assume the values 2, 4, 8, and 16, respectively. More generally, r1 equals $\max(r_{max}/8,1)$, and the values of r2 (and possibly r3 and r4) are subsequently determined by doubling the previous one up to $r_{max}$.

TABLE 2

Number of MPDCCH candidates in USS when UE is configured to monitor MPDCCH in CE Mode A with repetitions and in 2 or 4 PRBs

| PRBs to monitor | R | Number of MPDCCH candidates $M_p^L$ | | | | |
|---|---|---|---|---|---|---|
| | | L = 2 | L = 4 | L = 8 | L = 16 | L = 24 |
| 2 | r1 | 2 | 1 | 1 | 0 | 0 |
| 4 | | 1 | 1 | 1 | 1 | 0 |
| 2 | r2 | 2 | 1 | 1 | 0 | 0 |
| 4 | | 1 | 1 | 1 | 1 | 0 |
| 2 | r3 | 2 | 1 | 1 | 0 | 0 |
| 4 | | 1 | 1 | 1 | 1 | 0 |
| 2 | r4 | 2 | 1 | 1 | 0 | 0 |
| 4 | | 1 | 1 | 1 | 1 | 0 |

TABLE 3

Number of MPDCCH candidates in USS when UE is configured to monitor MPDCCH in CE Mode A with repetitions and in 6 (2 + 4) PRBs

| MPDCCH PRB set | R | Number of MPDCCH candidates $M_p^L$ | | | | |
|---|---|---|---|---|---|---|
| | | L = 2 | L = 4 | L = 8 | L = 16 | L = 24 |
| 2 PRB set in 2 + 4 PRB set | r1 | 1 | 1 | 0 | 0 | 0 |
| 4 PRB set in 2 + 4 PRB set | | 0 | 0 | 2 | 1 | 0 |
| Both PRB sets in 2 + 4 PRB set | | 0 | 0 | 0 | 0 | 1 |
| 2 PRB set in 2 + 4 PRB set | r2 | 0 | 1 | 1 | 0 | 0 |
| 4 PRB set in 2 + 4 PRB set | | 0 | 0 | 2 | 1 | 0 |
| Both PRB sets in 2 + 4 PRB set | | 0 | 0 | 0 | 0 | 1 |
| 2 PRB set in 2 + 4 PRB set | r3 | 0 | 0 | 0 | 0 | 0 |
| 4 PRB set in 2 + 4 PRB set | | 0 | 0 | 1 | 1 | 0 |
| Both PRB sets in 2 + 4 PRB set | | 0 | 0 | 0 | 0 | 1 |
| 2 PRB set in 2 + 4 PRB set | r4 | 0 | 0 | 0 | 0 | 0 |
| 4 PRB set in 2 + 4 PRB set | | 0 | 0 | 0 | 0 | 0 |
| Both PRB sets in 2 + 4 PRB set | | 0 | 0 | 0 | 0 | 1 |

MPDCCH candidates within the USS are illustrated in FIG. 4, FIG. 5 and FIG. 6 when MPDCCH is monitored within 2, 4, and 6 PRBs, respectively. The shaded boxes refer to examples of possible MPDCCH candidates at a particular point in time. When MPDCCH is monitored in 2 or 4 PRBs, all candidates apply to all possible number of repetitions, according to Table 2. This is in contrast to the 6 PRB case depicted in FIG. 4, where some of the candidates apply only for some of the repetition values, according to Table 3. Generally, the low aggregation levels, which are monitored within the 2 PRB part of the 6 PRBs only are applicable for the lower values of the configured number of repetitions. The intermediate aggregation levels are monitored within the 4 PRB part of the 6 PRBs, and are applicable for all but the highest repetition numbers. The maximum aggregation level 24 is applicable for all repetition numbers.

Similar to the case without MPDCCH repetitions, CSS-0 contains only candidates with the maximum aggregation level for the monitored set of PRBs, but in this case for all configured number of repetitions, i.e., generally from $r_{max}/8$ to $r_{max}$.

Several embodiments can be envisioned for how to employ the embodiments discussed above in the scenario with MPDCCH repetitions, including the ones described above for the case without repetition.

In some embodiments, the USS candidates are partitioned taking into account an effective code rate of the MPDCCH transmission. The code rate of the MPDCCH transmission is essentially inversely proportional to L and R. The term "essentially" is used here, since the exact code rate may depend on the fact that the number of resource elements available for MPDCCH transmissions may vary between subframes. According to the first embodiment, the CSS-0 is used for precoder cycling, and since this includes a candidate with the maximum aggregation level for all repetition levels, the partitioning of the USS can preferably be done so that the corresponding combinations in USS are associated with CSI-based precoding.

As an example, consider the case where MPDCCH is monitored in 4 PRBs, and $r_{max}=16$, in which case the UE is required to monitor MPDCCH candidates in USS characterized by each of the 16 possible combinations represented by the sets L∈{2, 4, 8, 16} and R∈{2, 4, 8, 16}. The highest code rate is then represented by the lowest product of L and R, which is 4, and the lowest code rate is represented by the highest product 256. For all values in between these maximum values, there are multiple combinations of L and R achieving the same code rate. Accordingly, in some embodiments, the combinations of L and R are partitioned such that for each effective code rate, some of the combinations are assigned to CSI based precoding and others to the predetermined one.

There are several ways in which the above code-rate based partitioning can be realized. Assume in this description that L is represented by an index $i_L$ such that, e.g., $L=2^{i_L}$. Similarly, let R be represented by an $i_R$ such that, e.g., $R=2^{i_R}$. Then, a constant code rate corresponds to that the sum $i_L+i_R$ is constant, as illustrated by the antidiagonal entries in Table 4 below.

TABLE 4

A constant code rate corresponds to that the sum $i_L + i_R$ is constant

| $i_L + i_R$ | $i_L = 1$<br>L = 2 | $i_L = 2$<br>L = 4 | $i_L = 3$<br>L = 8 | $i_L = 4$<br>L = 16 |
| --- | --- | --- | --- | --- |
| $i_R = 1$<br>R = 2 | 2 | 3 | 4 | 5 |
| $i_R = 2$<br>R = 4 | 3 | 4 | 5 | 6 |
| $i_R = 3$<br>R = 8 | 4 | 5 | 6 | 7 |
| $i_R = 4$<br>R = 16 | 5 | 6 | 7 | 8 |

In some embodiments, the partitioning into groups is based on one of the indices being odd or even. As one non-limiting example, CSI-based precoding is used if $i_L$ is even, otherwise precoder cycling is used.

In other embodiments, the partitioning is done such that lower or upper triangular part of the table above is associated with one of the precoding schemes. As one non-limiting example, CSI-based precoding is used for combinations with $i_L \geq i_R$, otherwise precoder cycling is used. In yet other embodiments, further restrictions can be defined for associating combinations of indices with precoding techniques. In one such non-limiting example, the CSI-based precoding is associated with the top row and rightmost column in the table, i.e., a condition $(i_R=1)|(i_L=4)$.

The embodiments outlined above can be used even if there is not a strict mathematical relation between the R and L and their corresponding indices. More generally, the embodiments, and variants thereof, can be applied also when the indices represent any order of increasing values of R and L. This can, for example, be applied for the cases where also aggregation level 24 is being used, corresponding to when the UE is configured to monitor MPDCCH candidates in 6 PRBs according to Table 3 above. Then, there is not a straightforward quantitative relation between all the index combinations and the corresponding code rate, though the qualitative relation is maintained, and the above embodiments, and variants thereof, can still be used.

Some embodiments relate to the case when the MPDCCH is employing frequency hopping, such that different sets of PRBs, typically belonging to different narrowbands, are used for MPDCCH transmission and monitoring at different time instants. The above embodiments for determining a precoding technique can be used also for this case. Depending on the reported CSI, the same or different precoders can be used for the different narrowbands in case of CSI-based reporting. However, there are some scenarios in which new solutions may be used.

One such scenario is a case where a valid CSI report is available in one of the narrowbands but not in the other, but this situation is known only to the network node. It may, for example, happen when the network detects a valid CSI for only one of the narrowbands even though the UE had been scheduled to transmit CSI for both narrowbands. Then, the eNB would typically decide to use a fallback solution by selecting a (part of a) search space associated with precoder cycling according to embodiments described earlier.

Another scenario is a case where a valid CSI report is available in one of the narrowbands but not in the other, and this situation is known to both the UE and the network node. It may, for example, happen when CSI has been reported for only one of the narrowbands, or when the one of the CSI reports have timed out. In one embodiment related to this case, a (part of a) search space normally associated with CSI-based precoding is employed, but the CSI-based precoder is only applied in the narrowband having a valid CSI report, and precoder cycling is applied in the narrowband for which no valid CSI report exists.

Some of the embodiments presented herein involve different parameters, particularly for how to determine what precoder technique to use for a certain MPDCCH candidate. This may, for example, relate to how to partition the USS such that some candidates are associated with CSI-based precoding and others with precoder cycling. These parameters may be defined from a standards document, or they may be configured by the network, e.g., via broadcast system information or dedicated Radio Resource Control (RRC) signaling.

Some of the embodiments presented herein involve different parameters, particularly for how to determine what precoder technique to use for a particular MPDCCH candidate. This relates both to parameters that have been mentioned explicitly in embodiments (e.g., A, B, k), but also parameters that in other ways can be used to determine the subgroups $G_1$ and $G_2$. These parameters may be defined from a standards document, or they may be configured by the network, e.g., via broadcast system information or dedicated radio resource control (RRC) signaling.

Some embodiments suggest a hybrid precoding technique that is a mixture of CSI-based precoding and a predefined precoding. By using this hybrid precoding, for the cases in which the CSI report is not reliable, decoded wrongly, or lost, the predefined precoding can compensate the degraded performance. The method is described for use within a wireless network, typically a cellular network comprising one or more network nodes, such as base stations, also denoted network nodes or eNBs, and one or more wireless devices, also denoted terminals or UEs. The embodiments disclosed herein can be applied to any node and device within the wireless network. The embodiments disclosed herein are described by means of downlink transmissions, i.e., from the network node to the wireless device but may be applied also to other scenarios.

Figure 7:
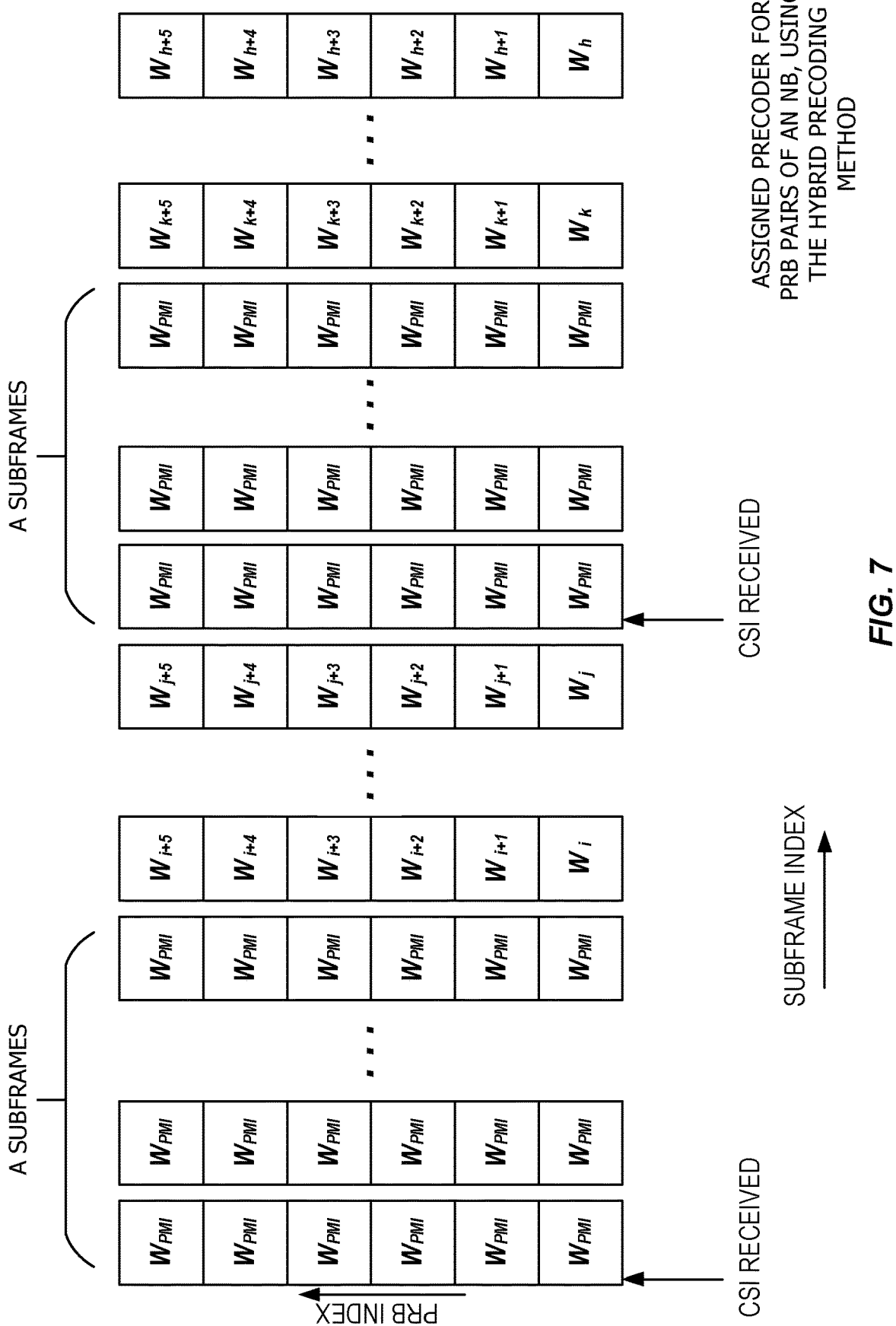
FIG. 7 illustrates the assigned precoders, for the transmission of the Physical Resource Block (PRB) pairs of a Narrowband (NB), according to some embodiments of the present disclosure.

In this hybrid precoding method, the precoding technique is selected based on the time/frequency position of the transmitted PRB. To simplify the description, consider a simple embodiment depicted in FIG. 7, where the assigned precoders, for the transmission of the PRB pairs of an NB, are shown. In this example, the network node uses the precoder defined by the periodic CSI, $w_{PMI}$ to transmit the first A subframes after receiving the CSI report. Then, for the transmission of the following subframes until the next CSI report is scheduled to be received, eNB uses cyclic precoding as a predefined precoding technique. This embodiment can be summarized as $$\text{precoding technique} = \begin{cases} \text{CSI-based precoding,} & (N_s \bmod CSI_p) < A \\ \text{cyclic precoding,} & \text{otherwise} \end{cases},$$

where $N_s$ and $CSI_p$ are the absolute subframe number and period of the CSI report. The parameter A can be selected, for example, as
an absolute number
a ratio (e.g., 75%) of the CSI period
Alternatively or additionally, A can be selected as a function of a few other parameters. As an example, in one embodiment, it can be selected based on one or more of the CSI period $CSI_p$ of a periodic CSI report, and the length L of the MPDCCH packets (including the number of the repetitions).

$A = f(CSI_p, L).$

Figure 8:
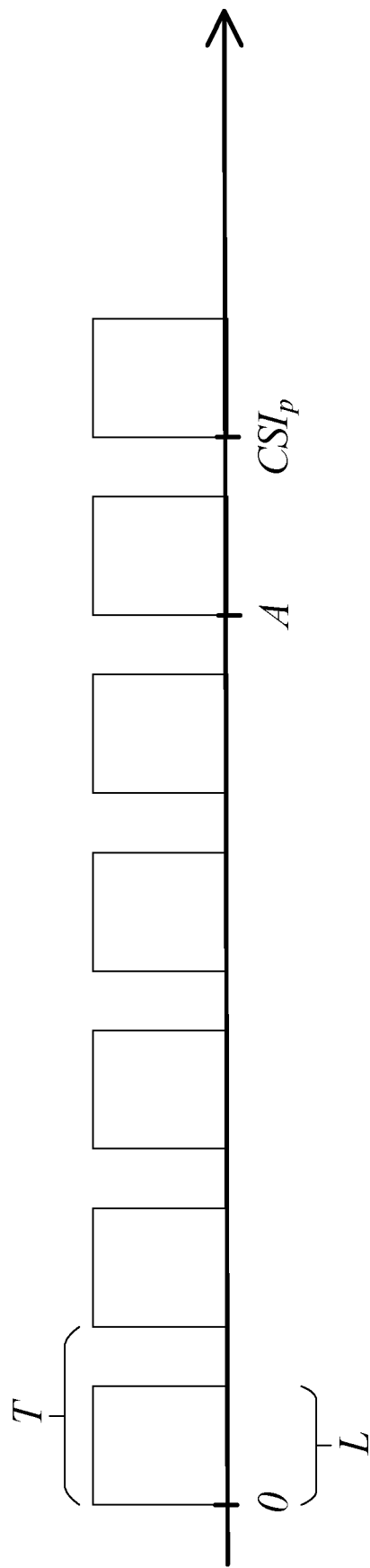
FIG. 8 illustrates an example where the maximum Machine-Type Communications (MTC) Physical Downlink Control Channel (MPDCCH) length is L, and the MPDCCH starting periodicity is T, according to some embodiments of the present disclosure.

In another embodiment, A can be based additionally or alternatively on a periodicity T with which the start of an MPDCCH transmission may occur. Referring to FIG. 8, where the (maximum) MPDCCH length is L, and the MPDCCH starting periodicity is T, A may be determined such that there is room for at least one MPDCCH transmission using cyclic precoding at the end of the CSI reporting periodicity. For the case when CSI reporting and MPDCCH periodicities are aligned such that $CSI_p$ is an integer multiple of T, A may be selected as $A = CSI_p - kT$ where k is a positive integer. In some embodiments, the MPDCCH starting periodicity is determined as the maximum MPDCCH length L multiplied by a constant G, in which case A may be expressed as $A = CSI_p - kGL$ In cases where the MPDCCH starting periodicity and the CSI reporting periodicity are not aligned, or there is otherwise a timing offset between the CSI reporting instances and the MPDCCH occurrences, the determination of A is adjusted accordingly to ensure that each type of precoding techniques is used at least for one MPDCCH occasion. A timing offset may, for example, refer to a case where there is a delay between the subframe in which the CSI reporting is scheduled and the first subframe in which a precoder according to the reported CSI is applied to an MPDCCH transmission.

In some embodiments, the number of MPDCCH occasions allocated to precoder cycling may itself depend on the maximum MPDCCH length. For example, a large L is typically used for UEs in bad coverage, in which case also the CSI reporting can be assumed to be less reliable. Therefore, there may be a benefit to increase use the fallback precoding technique, such as the precoder cycling, in these scenarios.

Figure 9:
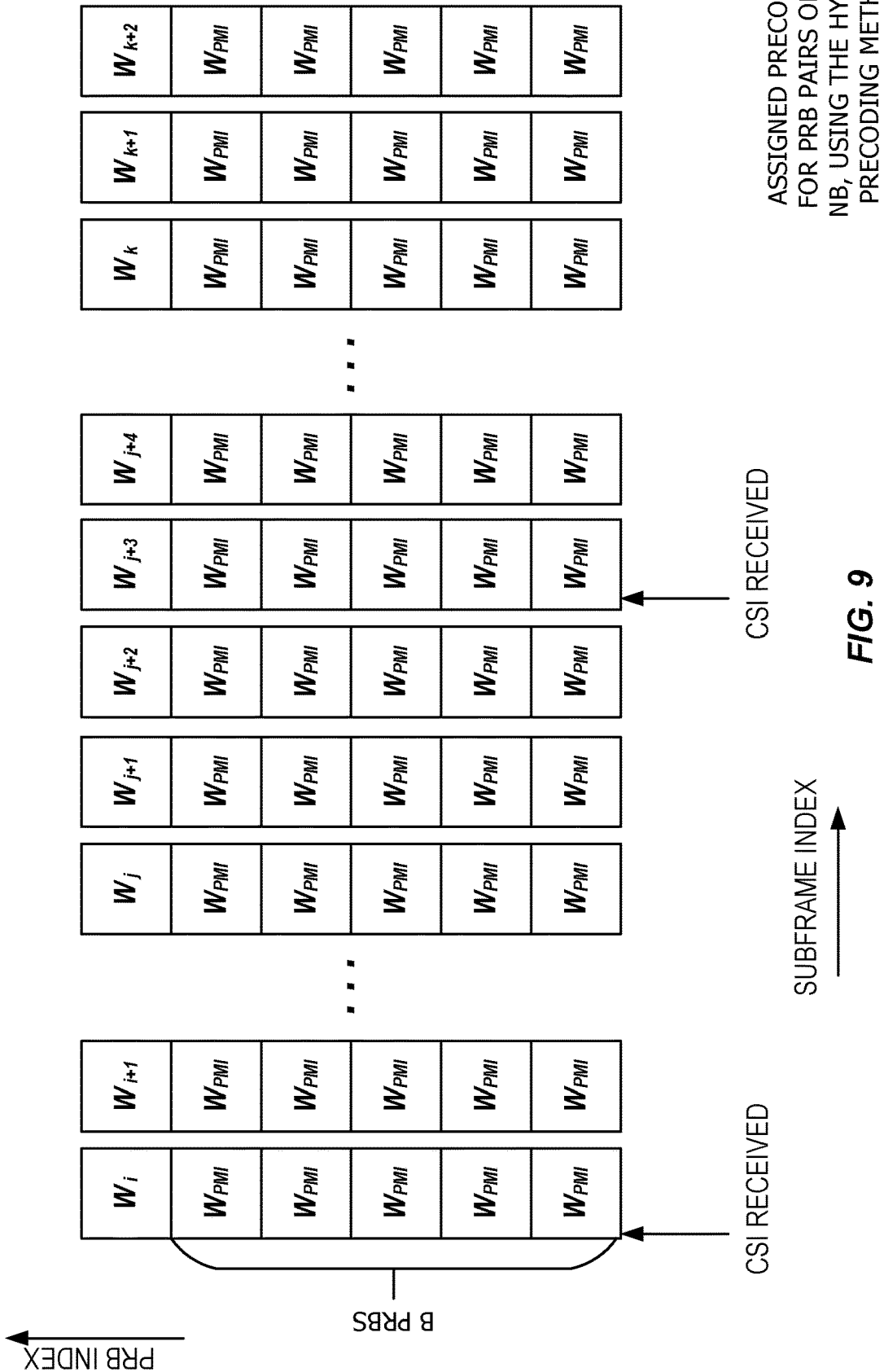
FIG. 9 illustrates a hybrid precoding method, according to some embodiments of the present disclosure.

In another embodiment, the network node can use the CSI-based precoding for the first B PRBs of an NB and use cyclic precoding for the other PRBs. The assigned precoders for this embodiment are shown in FIG. 9.

$$\text{precoding technique} = \begin{cases} \text{CSI-based precoding,} & PRB_j < B \\ \text{cyclic precoding,} & \text{otherwise} \end{cases}$$

The parameter B may further depend on other parameters, similar to the description of the parameter A above.

In a more general embodiment, the network node divides the transmitted subframes/PRBs in the time interval between two CSI reports, into two subgroups $G_1$ and $G_2$; for the transmission of the first subgroup, $G_1$, the network node uses the precoder defined by the latest CSI report and for the transmission of the second subgroup, $G_2$, the network node uses a predefined precoding method. Such a hybrid precoding technique for periodic CSI report can be summarized as $$\text{precoding technique} = \\ \begin{cases} \text{CSI-based precoding,} & f((N_s \bmod CSI_p), PRB_j) \in G_1 \\ \text{Predefined precoding,} & \text{otherwise} \end{cases}.$$

Figure 10:
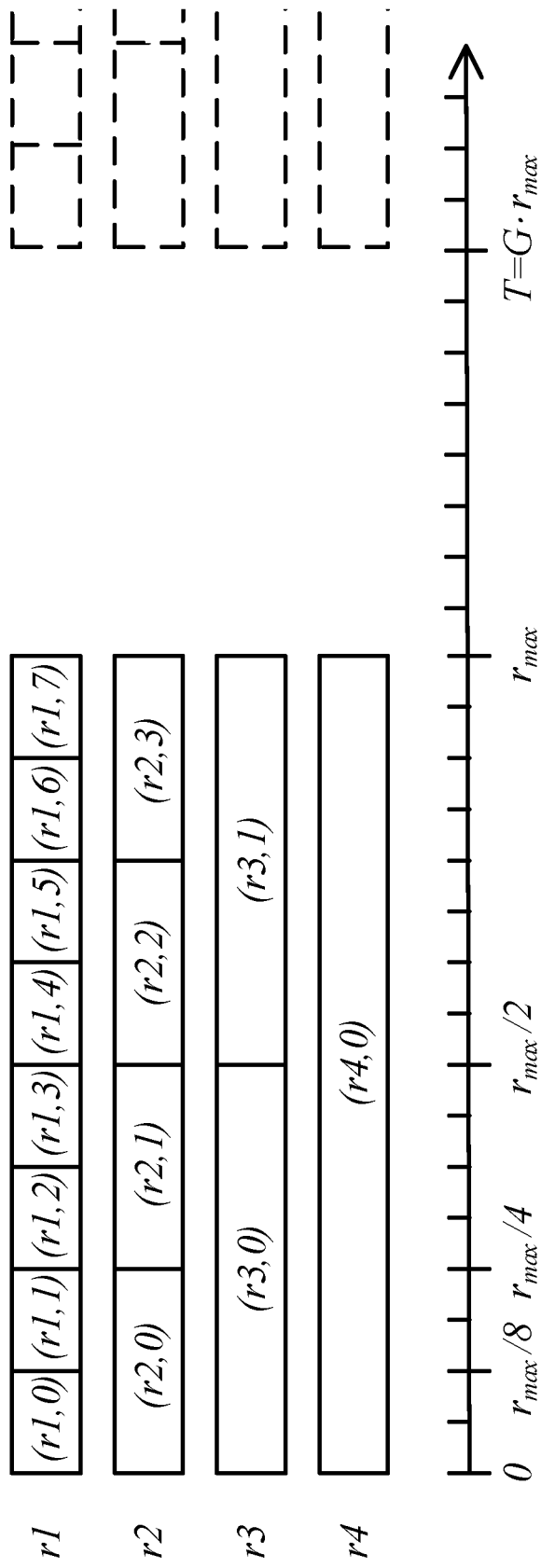
FIG. 10 illustrates a MPDCCH transmission with different repetition factors, according to some embodiments of the present disclosure.

In some embodiments, the partitioning into subgroups is done considering different possible MPDCCH repetition factors being used. FIG. 10 depicts four different repetition factors that can be used, and a UE may be required to receive one or more of these candidates, not overlapping in time. The parameter $r_{max}$ is the maximum number repetitions of subframes for an MPDCCH transmission that a UE is configured to receive. This typically corresponds to the parameter L used above. In addition, the UE may be required to receive MPDCCH transmissions using repetitions in $r_{max}/2$, $r_{max}/4$, and $r_{max}/8$ subframes, starting at any of the occasions indicated in FIG. 10. As illustrated in the figure, and similar to what was described above, there may also be a gap between possible starting points for the MPDCCH candidate with the length $r_{max}$. It can further be noted that the repetitions in the figure illustrate that the used subframes are contiguous in time, however there may also be gaps of one or more subframe within each MPDCCH transmission. These gaps may for example refer to subframes not being used any DL traffic to LTE-M devices, including uplink subframes in a time-division duplex (TDD) deployment.

The partitioning into the subgroups $G_1$ and $G_2$ can be done among the different MPDCCH candidates represented by pairs (R,m) where R is a particular number of repetitions between $r_{max}/8$ and $r_{max}$, and m is a sequential index identifying a time instant for an MPDCCH using that particular number of repetitions. As one non-limiting example, the last occasion for all repetitions except for the maximum number of repetition can belong to $G_2$, used for precoder cycling, whereas the rest belongs to $G_1$, used for CSI-based precoding. According to another example, CSI-based precoding is used for $r_{max}$ and $r_{max}/4$, whereas precoder cycling is used for $r_{max}/2$ and $r_{max}/8$. In order to allow for both precoding techniques to be used for any number of repetitions, the association between MPDCCH candidates and subgroups may be varying over time, for example in an alternating manner by toggling the group associations. This objective may also be achieved by combining these types of embodiments with any of the previous embodiments or variants thereof. For example, a first partitioning of MPDCCH candidates into subgroups is used for the first A subframes after a time instant where a CSI report is scheduled, whereas a second partitioning is used for the remaining subframes until a new CSI report is scheduled. The embodiments suggested herein can all be associated with a number of parameters determining how to partition the MPDCCH candidates into subgroups $G_1$ and $G_2$. These parameters may, for example, be used for determining which of the pairs (R,m) that belong to which subgroup, where one example could be parameters $N_R$ representing the number of occasions for a particular repetition number that is associated with one of the groups. Other parameters may define a toggling patter, such as a toggling period $T_{toggle}$ etc.

Several other possible embodiments can be envisioned, some of which are listed below. Different embodiments can be used separately or in combination with each other.

In one embodiment the subgroups $G_1$ and $G_2$, can be predefined and fixed, while in another embodiment the elements of these subgroups can be selected as a function of a few other parameters.

In one embodiment, the predefined precoding can be considered to be cyclic precoding whose first precoder index is selected pseudo-randomly as a function of the subframe/PRB index. This was addressed in an earlier patent application (U.S. Patent application 62/806,253 filed Feb. 15, 2019) hereby incorporated herein by reference. In general, different precoding cycling technique can be used for different embodiments.

In another embodiment the constant precoding can be considered as predefined precoding.

In some embodiments, alternative parameterizations are used for indicating the time and frequency parameters going into the function for selecting the precoding technique. In time domain the following non-limiting examples of such time index can be used:
  a slot number $n_s$ within a radio frame,
  a subframe number $\lfloor n_s/2 \rfloor$ within a radio frame, or
  an accumulated slot or subframe number, e.g., $10 n_f + \lfloor n_s/2 \rfloor$, where $n_f$ is the system frame number.

In an alternative embodiment, the CSI-based precoding and predefined precoding can be selected based on the frequency index, for example, refer to
  a PRB index in the system bandwidth,
  a PRB index within the narrowband where the MPDCCH is monitored, or
  a PRB index within the set of 2, 4, or 6 PRBs for which MPDCCH candidates are monitored, or
  an index relating to any other frequency granularity, such as a narrowband index or a subcarrier index.

In some embodiments, more than one type of index can be used for selecting the precoding method.

For the case of a missed CSI, in one embodiment eNB can use the latest received CSI report while in another embodiment eNB can continue using the predefined precoding technique until it receives a new CSI report.

In one embodiment the network node can divide the transmitted subframes/PRBs into N subgroups and use a different precoding technique—known also by UE—for each subgroup.

The embodiments described above for determining precoders for transmissions in a wireless network may be used in a network node in the wireless network, such as a base station or an eNB. More specifically, they may be used to determine what precoder to use for a transmission from the network node to one or more UEs.

In one embodiment, the network node attempts to receive a CSI report from a UE. If the CSI report is received successfully, the network node determines a precoder to use as indicated by a PMI contained in the CSI report. The network node further selects an MPDCCH candidate belonging to a subgroup $G_1$ which is intended to be used for CSI-based precoding and transmits the MPDCCH candidate using the precoder indicated by the PMI. If the CSI is not received successfully, the network node determines a precoder to use based on a predefined precoding technique, such as precoder cycling. The network node further selects an MPDCCH candidate belonging to subgroup $G_2$ which is intended to be used for the predefined precoding technique and transmits the MPDCCH candidate using the precoder determined based on the predefined precoding technique.

In one related embodiment, the subgroup $G_1$ comprises a first search space and the subgroup $G_2$ comprises a second search space.

In another related embodiment, the subgroup $G_1$ comprises a first subset of a first search space and the subgroup $G_2$ comprises the combination of a second search space and a second subset of the first search space, where the second subset is the complement of the first subset.

In a further related embodiment, the first search space comprises a UE-specific search space and the second search space comprises a Type 0-MPDCCH common search space.

In a related embodiment, upon determining that the CSI report is not received successfully, the eNB still selects an MPDCCH candidate belonging to a subgroup $G_1$ which is intended to be used for CSI-based precoding but uses the PMI according to latest correctly received CSI report. This embodiment can be particularly useful in scenarios where the eNB can assume that the channel variations for the communication between the eNB and the UE change slowly, such that an older CSI report likely is still valid. It may further be particularly useful in scenarios where the subgroups $G_1$ is applied for a large initial portion of the CSI reporting period $CSI_p$ and $G_2$ is applied only at the end. Instead of waiting with MPDCCH transmission until the predefined (fallback) technique is used, the network may try communicating with the UE using the old precoder. The use of the old precoder may be aborted if the network does not receive a confirmation within a certain time $T_{thres}$ that the old precoder is useful for MPDCCH transmission. This confirmation may, for example, refer to the eNB receiving an HARQ feedback related to a DL PDSCH transmission scheduled via MPDCCH, or receiving an UL PUSCH transmission scheduled via MPDCCH. The time $T_{thres}$ can be expressed in any time unit such subframes, a number of MPDCCH transmission attempts, a multiple of $r_{max}$ or similar. If the eNB does not receive such a confirmation, it may continue by trying an MPDCCH candidate belonging to subgroup $G_2$ which is intended to be used for the predefined precoding technique, according to the above embodiment.

In one embodiment, the network node furthermore uses the determined precoder to use in a particular PRB pair to transmit DM-RS in the PRB pair.

In related embodiments, the network node furthermore uses the determined precoder to transmit information associated with a physical channel in the PRB pair. In one such embodiment, the information is associated with the MTC Physical Control Channel, MPDCCH. In another embodiment, the information is associated with the Physical Downlink Shared Channel, PDSCH.

The embodiments described above for determining precoders for transmissions in a wireless system and in a network node all have corresponding embodiments in a UE. In general, in order for the UE to determine what precoder the network node has used (either the CSI-based or the predefined) in its transmission, it applies the same method for determining the used precoder determination as is done in the network node.

In one embodiment, the UE determines a number of MPDCCH candidates to monitor in a plurality of search spaces using a user specific RNTI. For each candidate, the UE determines whether the candidate belongs to a subgroup $G_1$ which is intended to be used for CSI-based precoding or a subgroup $G_2$ which is intended to be used for the predefined precoding technique, such as precoder cycling. This determination is based on what search space the candidate belongs to, and/or some characterization of the candidate identifying which subset of the search space the candidate belongs to, where the subset is associated with one of the precoding techniques.

In one related embodiment, the subgroup $G_1$ comprises a first search space and the subgroup $G_2$ comprises a second search space.

In another related embodiment, the subgroup $G_1$ comprises a first subset of a first search space and the subgroup $G_2$ comprises the combination of a second search space and a second subset of the first search space, where the second subset is the complement of the first subset.

In a further related embodiment, the first search space comprises a UE-specific search space and the second search space comprises a Type 0-MPDCCH common search space.

In one embodiment, the UE furthermore uses the determined precoder being used in a PRB pair for obtaining channel estimates associated with the antenna ports used for transmission in the PRB pair by performing channel estimation based on a combination of the DM-RS located in the PRB pair and at least one of the DM-RS located in one or more other PRB pairs, and CRS located in any set of PRB pairs.

In a related embodiment, the UE uses the determined precoder being used in a PRB pair for obtaining channel estimates associated with the antenna ports used for transmission in another PRB pair by performing channel estimation based on a combination of the DM-RS located in the PRB pair and at least one of the DM-RS located in one or more other PRB pairs, and CRS located in any set of PRB pairs.

In another related embodiment, the UE uses the determined precoder being used in a PRB pair for obtaining channel estimates associated with the antenna ports used for transmission in the PRB pair by performing channel estimation based on CRS located in any set of PRB pairs.

Mirroring the description for the network node embodiments, the UE receives an MPDCCH candidate, and based on one or more index representing the time and/or frequency location of the PRB pair, determines whether it belongs to the subgroup $G_1$ or $G_2$.

Figure 11:
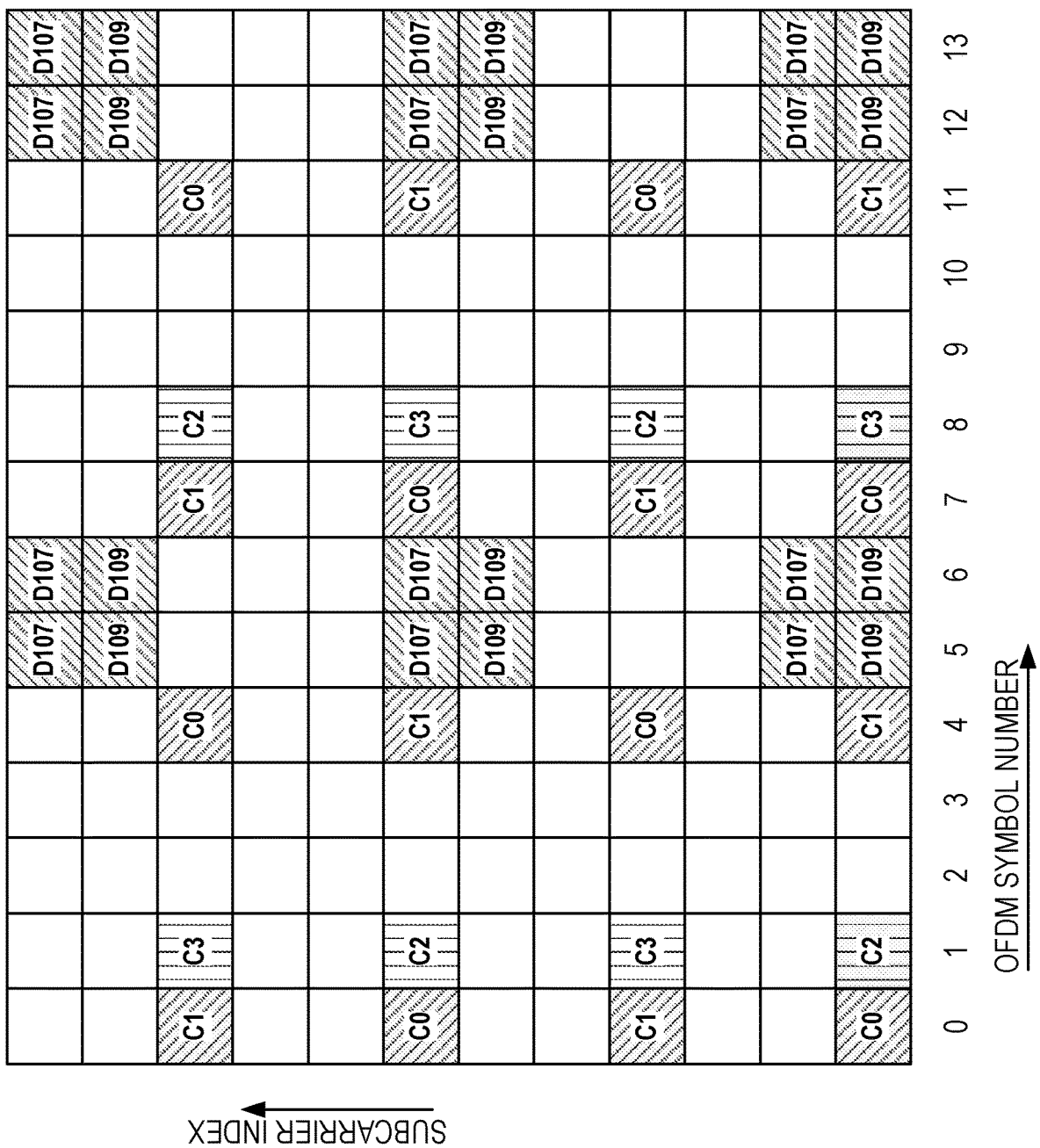
FIG. 11 illustrates an exemplary resource element mapping, according to some embodiments of the present disclosure.
Figure 12:
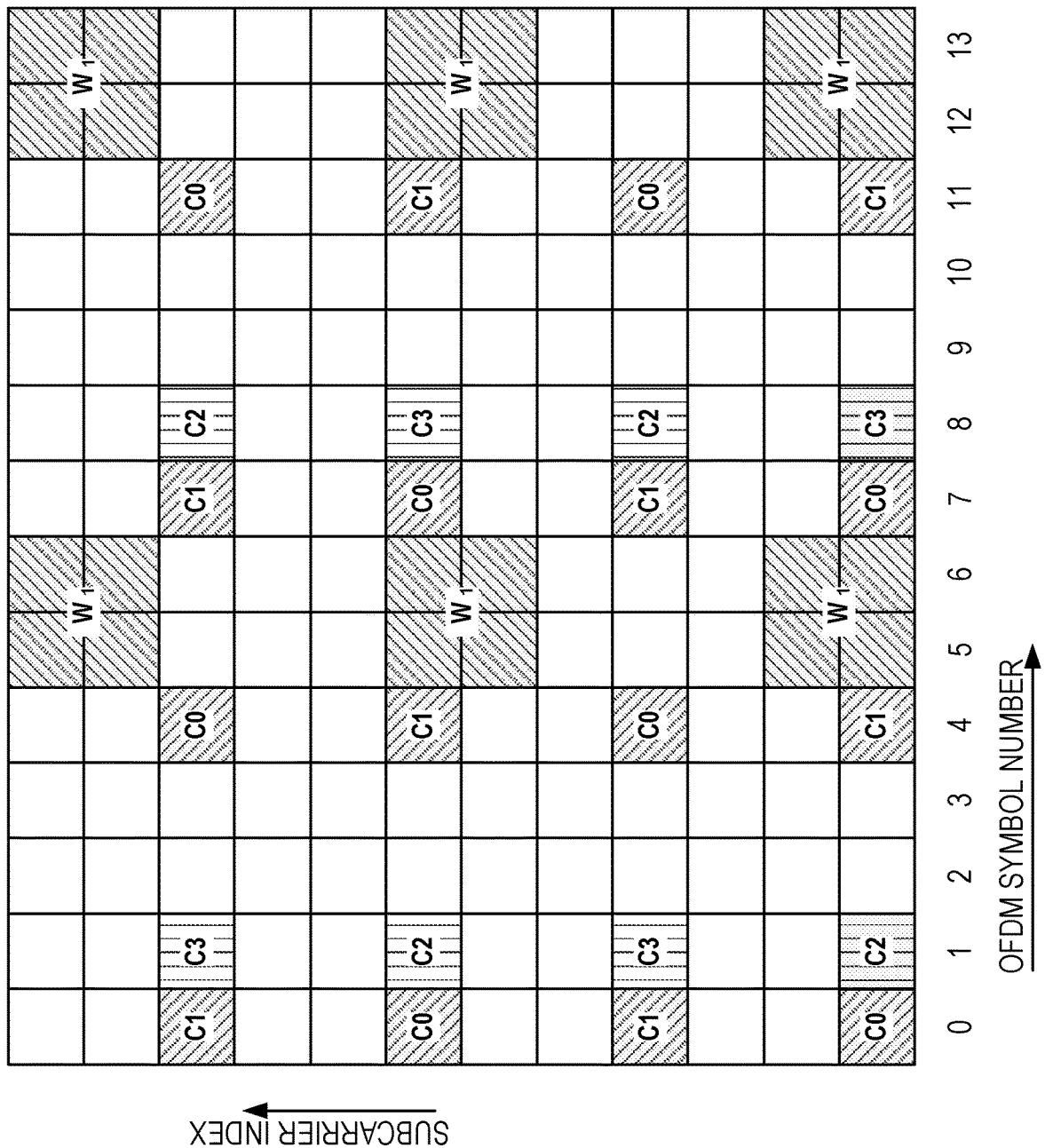
FIG. 12 illustrates an example using a precoder matrix defining a relation between the DMRS ports in one PRB pair to CRS ports, according to some embodiments of the present disclosure.

FIG. 11 shows exemplary locations for resource elements within one PRB pair carrying CRS using antenna ports 0 to 3, denoted C0, C1, C2, and C3, respectively. Similarly, exemplary locations are shown for resource elements carrying DM-RS using antenna ports 107 and 109, denoted D107 and D109, respectively. FIG. 12 further illustrates an example when a precoder matrix $w_1$ is used for defining the relation between the DM-RS ports 107 and 109 and the CRS ports 0-3 within the PRB pair. The above mentioned embodiments for performing channel estimates based on combination of different reference signals will now be briefly discussed with reference to these figures.

Referring to FIG. 11 and FIG. 12, channel estimates for the DM-RS antenna ports 107 and 109 within one PRB pair may be derived based on CRS ports 0 to 3 in several different ways.

In a first channel estimation embodiment, the channel estimates for each antenna port are first done individually for all (or generally a subset of) antenna ports 0, 1, 2, 3, 107, and 109 using any channel estimation technique known in prior art. A basic principle for such techniques is that a (complex) value representing the received signal associated with a resource element containing a reference signal is divided by the known (complex) value of the symbol transmitted on this resource element to form a raw channel estimate for the resource element. Due to noise and interference, each such raw channel estimate will have a certain channel estimation error. Multiple resource elements associated with the same antenna port within the PRB pair can then be combined using interpolation and other filtering techniques to obtain filtered channel estimates for any resource element within the PRB pair. Some of these techniques are referred to as MMSE channel estimation, which strives at Minimizing a Mean Squared Error of the channel estimates. Once channel estimates for all antenna ports have been obtained individually, these can be combined to obtain improved channel estimates for the DM-RS ports. Assume that the channel estimates obtained per port individually for a particular resource element are denoted $\hat{h}_0$, $\hat{h}_1$, $\hat{h}_3$ and $\hat{h}_3$ for CRS ports 0-3, and $\hat{h}_{107}$ and $\hat{h}_{109}$ for DM-RS ports 107 and 109, respectively. Further, let these channel estimates be collected into vectors $\hat{h}_{CRS}=[\hat{h}_0, \hat{h}_1, \hat{h}_2, \hat{h}_3]^T$ and $\hat{h}_{DM\text{-}RS}[\hat{h}_{107}, \hat{h}_{109}]^T$, respectively. Then, improved channel estimates $\bar{h}_{DM\text{-}RS}$ for the DM-RS ports when a precoder matrix $w_1$ is used may, for example, be derived according to $$\bar{h}_{DM\text{-}RS} = \alpha_{DM\text{-}RS} \cdot \hat{h}_{DM\text{-}RS} + \alpha_{CRS} \cdot w_1 \cdot \hat{h}_{CRS}$$

where $\alpha_{DM\text{-}RS}$ and $\alpha_{CRS}$ are parameters that may, as a non-limiting example, be selected with the aim to minimize a mean square error of the combined channel estimate. Optimal selection of these parameters may depend on an expected channel estimation error for the DM-RS and CRS based channel estimates, respectively. These may in turn depend on the number of resource elements available for the different types of channel estimates, as well as any known possible power difference with which the DM-RS and CRS ports are transmitted by the eNB. Furthermore, optimal parameter selection may be different for different resource elements, since, for example, the channel estimation error for a particular antenna port can be expected to be smaller in resource elements close to where a reference signal is transmitted than further away.

In a second channel estimation embodiment, the channel estimation is obtained for the DM-RS ports via first estimating the channel of the CRS ports and in that process use also the resource elements where reference symbols for the DM-RS port are transmitted, taking the given precoder and known possible power difference into account. Thereby, the channel estimates for the CRS ports will have lower channel estimates compared to when using only the resource elements for which the CRS are transmitted. Once the CRS based estimates are obtained, the channel estimates for the DM-RS ports can be obtained by multiplication with the precoder matrix used in the PRB pair.

Several other variants and alternatives to the above channel estimation algorithms can be envisioned. The current disclosure is not limited to a particular channel estimation algorithm being used for combining the CRS and DM-RS ports.

In some embodiments, the UE furthermore uses the obtained channel estimates associated with the antenna ports used for transmission in one or more PRB pair to demodulate information received in the PRB pairs. In one such embodiment, the information is associated with the MTC Physical Control Channel, MPDCCH. In another embodiment, the information is associated with the Physical Downlink Shared Channel, PDSCH.

In the description above, precoder determination has mainly been described with application to MPDCCH in an LTE system, and for relating DM-RS to CRS. The current disclosure is however not limited to this case but can be applied also for establishing relation between dedicated demodulation reference signals and common reference signals for the data channel PDSCH or other channels in LTE or other radio access technologies when DM-RS based transmission modes are used. Likewise, it is possible to apply the current disclosure to a more general case, when there are not necessarily any common reference signals transmitted, but the precoders represent a relation between the DM-RS and a set of virtual and/or physical antenna ports at the transmitter In such cases, each precoder itself may not necessarily be useful for a receiver, but when a set of multiple precoders are used, a receiver may use the information of the multiple precoders in order to perform combined channel estimation over the multiple resource blocks in which the multiple precoders are being used.

Some embodiments of the current disclosure may further be generalized to other communication scenarios not limited by the above description. One such example is sidelink, or peer-to-peer, communication between two UEs. Another example is uplink communication, when a UE is the transmitting end and a base station is the receiving end. It may be noted that the embodiments of the current disclosure may be applied at a transmitting end, without necessarily being applied at a corresponding receiving end.

Figure 13:
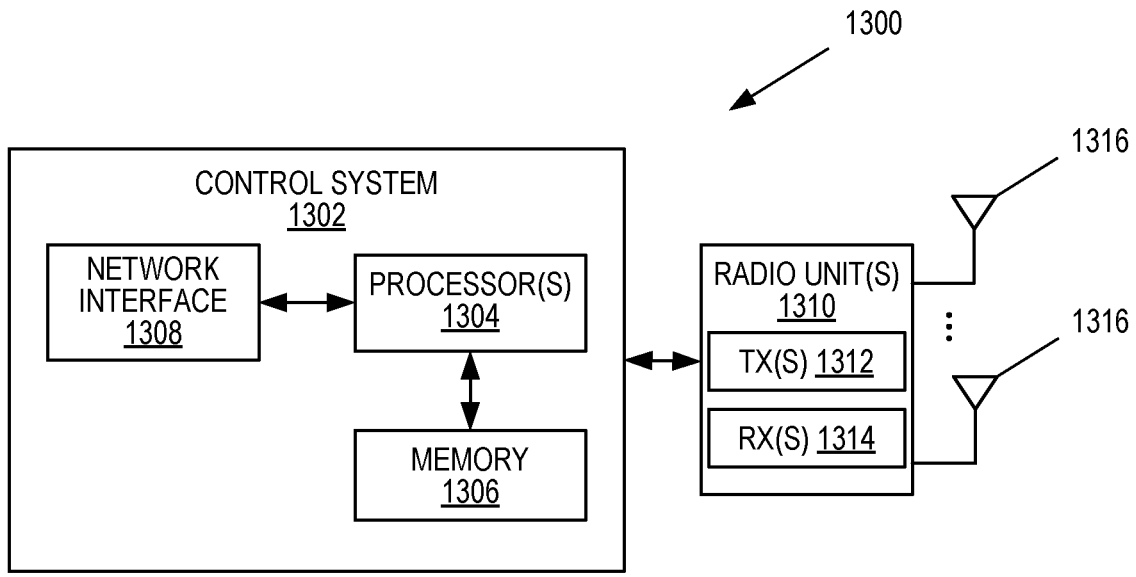
FIG. 13 is a schematic block diagram of a radio access node according to some embodiments of the present disclosure.

FIG. 13 is a schematic block diagram of a radio access node 1300 according to some embodiments of the present disclosure. The radio access node 1300 may be, for example, a base station 102 or 106. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node (s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the radio access node 1300 described herein are implemented at the one or more processing nodes 1400 or distributed across the control system 1302 and the one or more processing nodes 1400 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
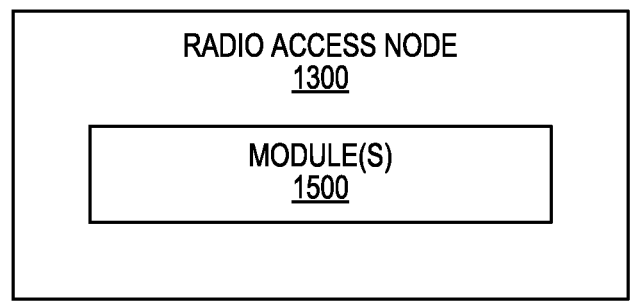
FIG. 15 is a schematic block diagram of the radio access node according to some other embodiments of the present disclosure.

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
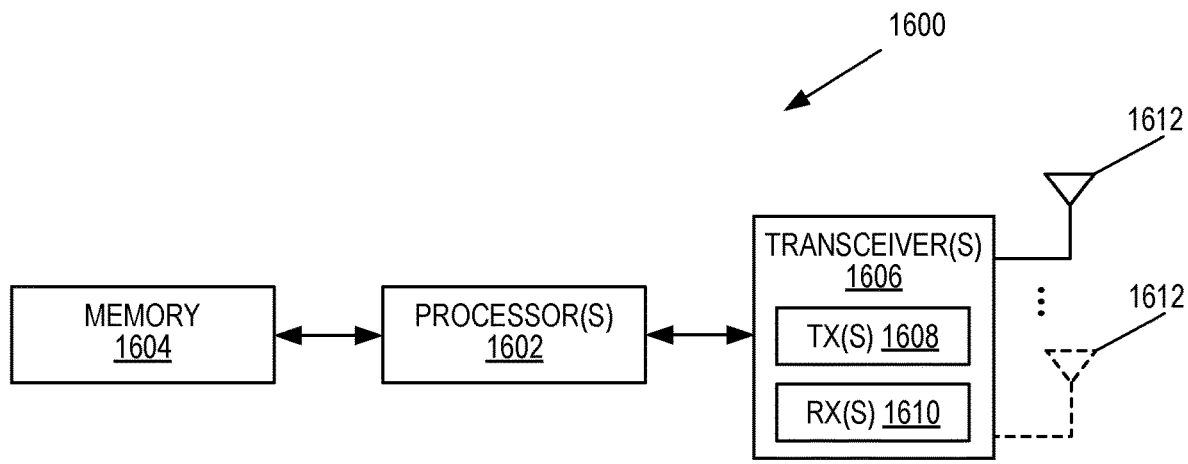
FIG. 16 is a schematic block diagram of a UE according to some embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the UE 1600 described above may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
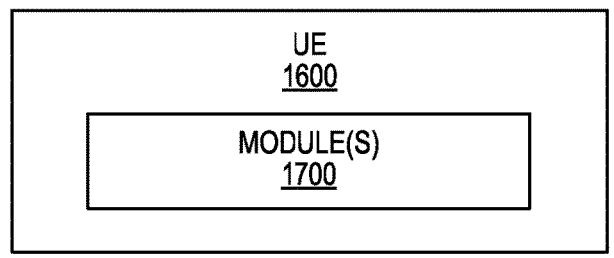
FIG. 17 is a schematic block diagram of the UE according to some other embodiments of the present disclosure.

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein.

Figure 18:
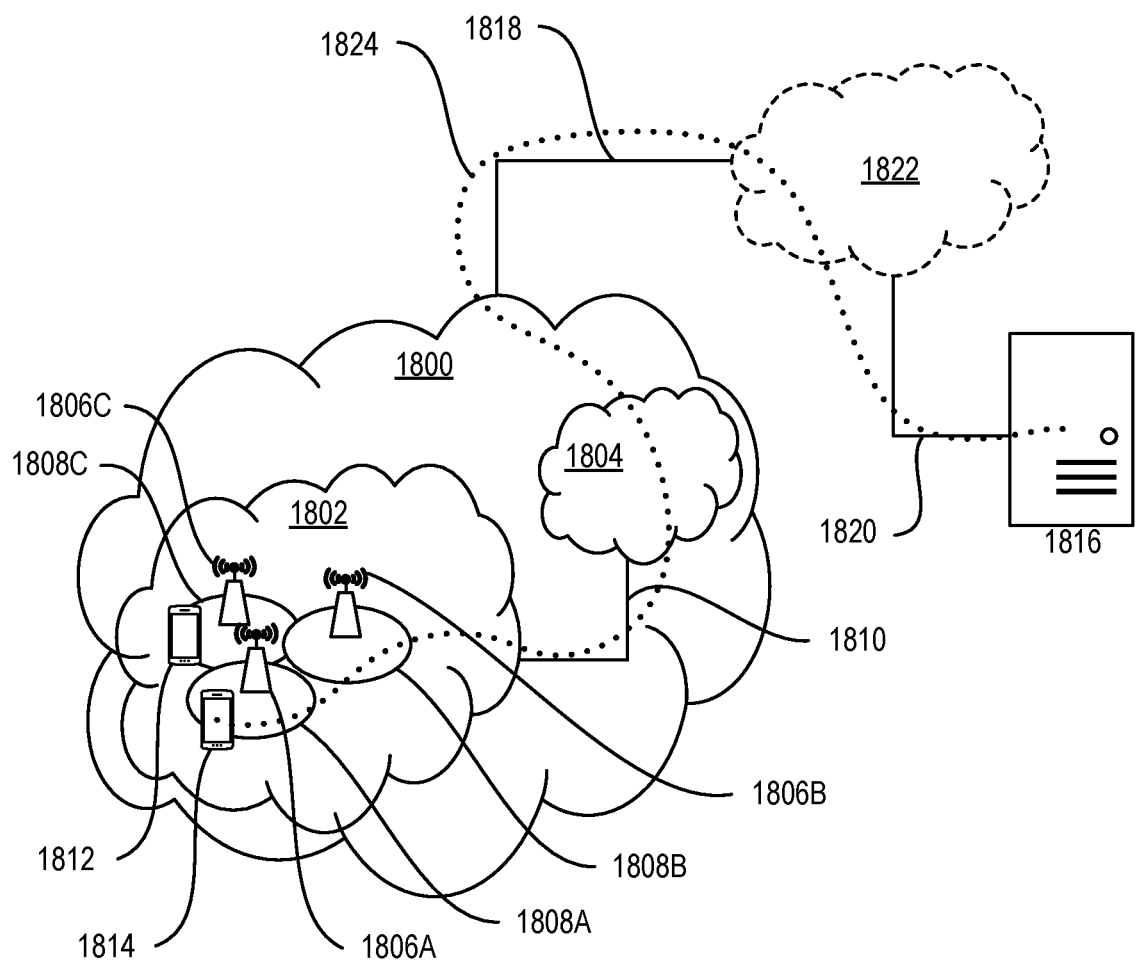
FIG. 18 illustrates a communication system including a telecommunication network, such as a 3GPP-type cellular network according to some embodiments of the present disclosure.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as NBs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
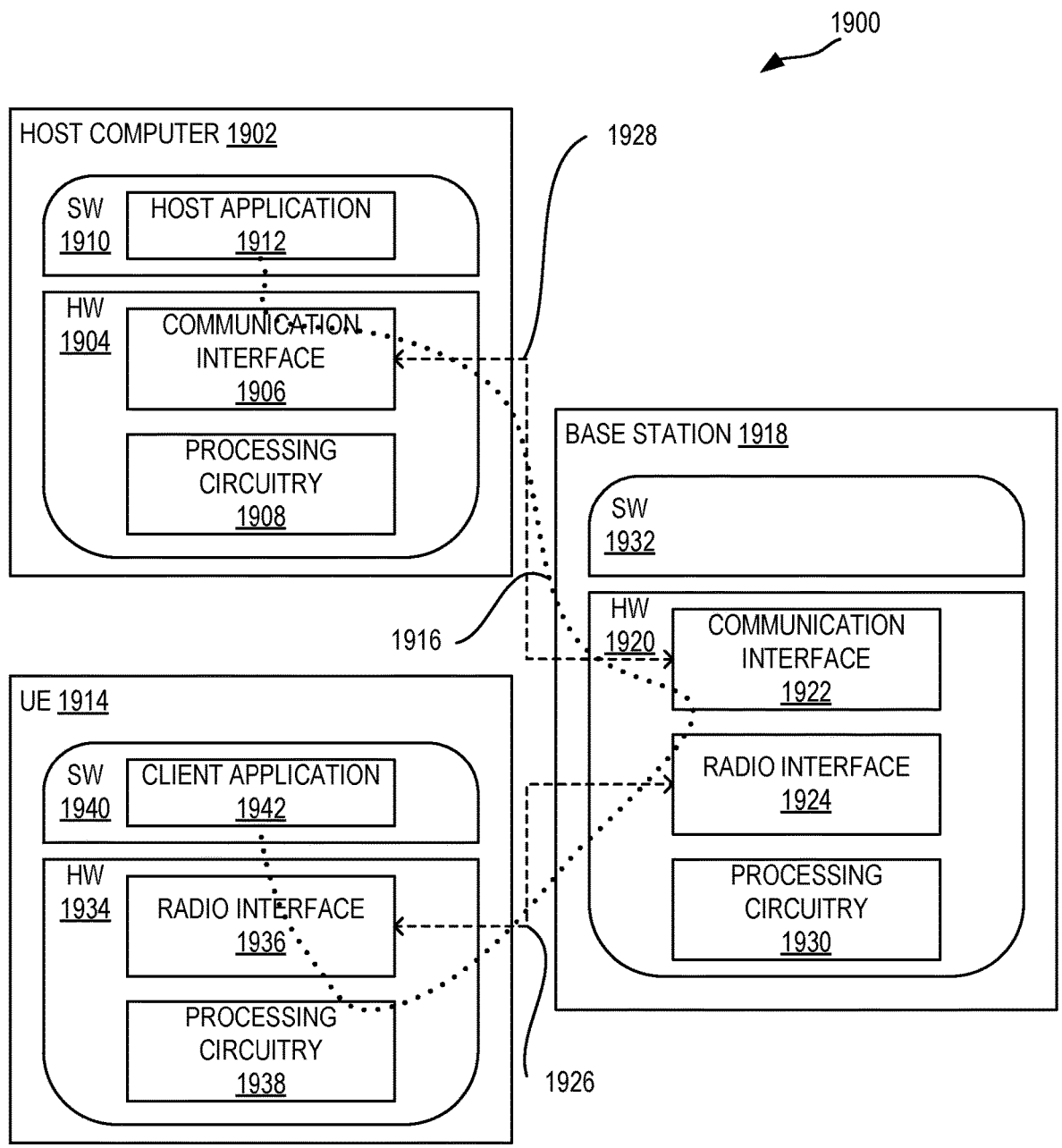
FIG. 19 illustrates a communication system including a host computer, according to some embodiments of the present disclosure.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, extended operating range, etc.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

1. A method performed by a wireless device for decoding a transmission, the method comprising:
  determining a plurality of transmission candidates to monitor;
  for one or more candidates of the plurality of transmission candidates, determining whether the candidate belongs to a first group of candidates or a second group of candidates;
  if the candidate belongs to the first group of candidates, attempting to decode the transmission using a CSI-based precoding scheme; and
  if the candidate belongs to the second group of candidates, attempting to decode the transmission using a predetermined precoding scheme
2. The method of embodiment 1 wherein the transmission is a MPDCCH transmission.
3. The method of any of embodiments 1 to 2 wherein determining whether the candidate belongs to a first group of candidates or a second group of candidates comprises determining based on at least one of a time or frequency location of the associated resource block.
4. The method of any of embodiments 1 to 3 wherein the precoding technique is determined based on at least one of a time index representing the time location of the resource block counted in a time unit and a frequency index representing the frequency location of the resource block counted in a frequency unit.
5. The method of any of embodiments 1 to 4 wherein the time unit corresponds to a subframe.
6. The method of any of embodiments 1 to 5 wherein the frequency unit corresponds to the frequency range of a resource block.
7. The method of any of embodiments 1 to 6 wherein the thresholds for using a precoding technique is determined based on a few other parameters.
8. The method of any of embodiments 1 to 7 wherein cycling over a set of precoders is considered as the predefined precoding.
9. The method of any of embodiments 1 to 8 wherein the index of the first precoder is generated based on at least one of a time index representing the time location of the resource block and a frequency index representing the frequency location of the resource block.
10. The method of any of embodiments 1 to 9 wherein a fixed precoder can be used as the predefined precoding.
11. The method of any of embodiments 1 to 10 wherein the frequency unit corresponds to the frequency range of a resource block.
12. The method of any of embodiments 1 to 11 wherein the precoding technique is chosen from the group consisting of: selecting the precoder based on CSI transmitted from the wireless device; selecting the precoder based on precoder cycling; and selecting a fixed precoder.
13. The method of any of embodiments 1 to 12 wherein the subset of the physical resource blocks belongs to different narrowbands when the control channel candidate is transmitted using frequency hopping.
14. The method of any of embodiments 1 to 13 wherein frequency hopping between at least two different narrowbands is employed, and one precoding technique is used in one of the narrowbands and a different precoding technique is used in at least one other narrowband.
15. The method of any of embodiments 1 to 14 wherein the set of precoding matrices comprises a plurality of precoding matrices when the precoding technique is based on precoder cycling.
16. The method of any of embodiments 1 to 15 wherein the channel state information comprises a precoding matrix indicator, PMI.
17. The method of any of embodiments 1 to 16 further comprising:
  using the determined precoder being used in a PRB pair for obtaining channel estimates associated with the antenna ports used for transmission in the PRB pair by performing channel estimation based on a combination of the DM-RS located in the PRB pair and at least one of the DM-RS located in one or more other PRB pairs, and CRS located in any set of PRB pairs.
18. The method of any of embodiments 1 to 17 further comprising:
  using the determined precoder being used in a PRB pair for obtaining channel estimates associated with the antenna ports used for transmission in another PRB pair by performing channel estimation based on a combination of the DM-RS located in the PRB pair and at least one of the DM-RS located in one or more other PRB pairs, and CRS located in any set of PRB pairs.

19. The method of any of embodiments 1 to 18 further comprising:
   using the determined precoder being used in a PRB pair for obtaining channel estimates associated with the antenna ports used for transmission in the PRB pair by performing channel estimation based on CRS located in any set of PRB pairs.

20. The method of any of embodiments 1 to 19 further comprising:
   using the obtained channel estimates associated with the antenna ports used for transmission in one or more PRB pair to demodulate information received in the PRB pairs.

21. The method of embodiment 20 wherein the information is associated with the MTC Physical Control Channel, MPDCCH, or the Physical Downlink Shared Channel, PDSCH.

22. The method of any of embodiments 1 to 21 wherein the predetermined precoding scheme would be to use some kind of precoder cycling, where the precoder used varies according to a predetermined pattern in time and/or frequency.

23. The method of any of the previous embodiments, further comprising:
   providing user data; and
   forwarding the user data to a host computer via the transmission to the base station.

Group B Embodiments

24. A method performed by a base station for encoding a transmission, the method comprising:
   determining whether to encode a transmission to a wireless device using a CSI-based precoding scheme or a predetermined precoding scheme;
   if using the CSI-based precoding scheme, choosing a candidate for transmission from a first group of candidates;
   if using the predetermined precoding scheme, choosing a candidate for transmission from a second group of candidates 25. The method of embodiment 24 wherein the transmission is a MPDCCH transmission.

26. The method of any of embodiments 24 to 25 wherein determining whether the candidate belongs to a first group of candidates or a second group of candidates comprises determining based on at least one of a time or frequency location of the associated resource block.

27. The method of any of embodiments 24 to 26 wherein the precoding technique is determined based on at least one of a time index representing the time location of the resource block counted in a time unit and a frequency index representing the frequency location of the resource block counted in a frequency unit.

28. The method of any of embodiments 24 to 26 wherein the time unit corresponds to a subframe.

29. The method of any of embodiments 24 to 28 wherein the frequency unit corresponds to the frequency range of a resource block.

30. The method of any of embodiments 24 to 29 wherein the thresholds for using a precoding technique is determined based on a few other parameters.

31. The method of any of embodiments 24 to 30 wherein cycling over a set of precoders is considered as the predefined precoding.

32. The method of any of embodiments 24 to 31 wherein the index of the first precoder is generated based on at least one of a time index representing the time location of the resource block and a frequency index representing the frequency location of the resource block.

33. The method of any of embodiments 24 to 32 wherein a fixed precoder can be used as the predefined precoding.

34. The method of any of embodiments 24 to 33 wherein the frequency unit corresponds to the frequency range of a resource block.

35. The method of any of embodiments 24 to 34 wherein the precoding technique is chosen from the group consisting of: selecting the precoder based on CSI transmitted from the wireless device; selecting the precoder based on precoder cycling; and selecting a fixed precoder.

36. The method of any of embodiments 24 to 35 wherein the subset of the physical resource blocks belongs to different narrowbands when the control channel candidate is transmitted using frequency hopping.

37. The method of any of embodiments 24 to 36 wherein frequency hopping between at least two different narrowbands is employed, and one precoding technique is used in one of the narrowbands and a different precoding technique is used in at least one other narrowband.

38. The method of any of embodiments 24 to 37 wherein the set of precoding matrices comprises a plurality of precoding matrices when the precoding technique is based on precoder cycling.

39. The method of any of embodiments 24 to 38 wherein the channel state information comprises a precoding matrix indicator, PMI.

40. The method of any of embodiments 24 to 39 wherein the predetermined precoding scheme would be to use some kind of precoder cycling, where the precoder used varies according to a predetermined pattern in time and/or frequency.

41. The method of any of the previous embodiments, further comprising:
   obtaining user data; and
   forwarding the user data to a host computer or a wireless device.

Group C Embodiments

42. A wireless device for decoding a transmission, the wireless device comprising:
   processing circuitry configured to perform any of the steps of any of the Group A embodiments; and
   power supply circuitry configured to supply power to the wireless device.

43. A base station for encoding a transmission, the base station comprising:
   processing circuitry configured to perform any of the steps of any of the Group B embodiments; and
   power supply circuitry configured to supply power to the base station.

44. A User Equipment, UE, for decoding a transmission, the UE comprising:
   an antenna configured to send and receive wireless signals;
   radio front-end circuitry connected to the antenna and to processing circuitry, and configured to condition signals communicated between the antenna and the processing circuitry;

the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

45. A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.

46. The communication system of the previous embodiment further including the base station.

47. The communication system of the previous 2 embodiments, further including the UE, wherein the UE is configured to communicate with the base station.

48. The communication system of the previous 3 embodiments, wherein:
the processing circuitry of the host computer is configured to execute a host application, thereby providing the user data; and
the UE comprises processing circuitry configured to execute a client application associated with the host application.

49. A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the base station performs any of the steps of any of the Group B embodiments.

50. The method of the previous embodiment, further comprising, at the base station, transmitting the user data.

51. The method of the previous 2 embodiments, wherein the user data is provided at the host computer by executing a host application, the method further comprising, at the UE, executing a client application associated with the host application.

52. A User Equipment, UE, configured to communicate with a base station, the UE comprising a radio interface and processing circuitry configured to perform the method of the previous 3 embodiments.

53. A communication system including a host computer comprising:
processing circuitry configured to provide user data; and
a communication interface configured to forward user data to a cellular network for transmission to a User Equipment, UE;
wherein the UE comprises a radio interface and processing circuitry, the UE's components configured to perform any of the steps of any of the Group A embodiments.

54. The communication system of the previous embodiment, wherein the cellular network further includes a base station configured to communicate with the UE.

55. The communication system of the previous 2 embodiments, wherein:
the processing circuitry of the host computer is configured to execute a host application, thereby providing the user data; and
the UE's processing circuitry is configured to execute a client application associated with the host application.

56. A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the UE performs any of the steps of any of the Group A embodiments.

57. The method of the previous embodiment, further comprising at the UE, receiving the user data from the base station.

58. A communication system including a host computer comprising:
communication interface configured to receive user data originating from a transmission from a User Equipment, UE, to a base station;
wherein the UE comprises a radio interface and processing circuitry, the UE's processing circuitry configured to perform any of the steps of any of the Group A embodiments.

59. The communication system of the previous embodiment, further including the UE.

60. The communication system of the previous 2 embodiments, further including the base station, wherein the base station comprises a radio interface configured to communicate with the UE and a communication interface configured to forward to the host computer the user data carried by a transmission from the UE to the base station.

61. The communication system of the previous 3 embodiments, wherein:
the processing circuitry of the host computer is configured to execute a host application; and
the UE's processing circuitry is configured to execute a client application associated with the host application, thereby providing the user data.

62. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

63. A method implemented in a communication system including a host computer, a base station, and a User Equipment, UE, the method comprising:
at the host computer, receiving user data transmitted to the base station from the UE, wherein the UE performs any of the steps of any of the Group A embodiments.

64. The method of the previous embodiment, further comprising, at the UE, providing the user data to the base station.

65. The method of the previous 2 embodiments, further comprising:
at the UE, executing a client application, thereby providing the user data to be transmitted; and
at the host computer, executing a host application associated with the client application.

66. The method of the previous 3 embodiments, further comprising:

at the UE, executing a client application; and
at the UE, receiving input data to the client application, the input data being provided at the host computer by executing a host application associated with the client application;
wherein the user data to be transmitted is provided by the client application in response to the input data.

67. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

68. The communication system of the previous embodiment further including the base station.

69. The communication system of the previous 2 embodiments, further including the UE, wherein the UE is configured to communicate with the base station.

70. The communication system of the previous 3 embodiments, wherein:
the processing circuitry of the host computer is configured to execute a host application; and
the UE is configured to execute a client application associated with the host application, thereby providing the user data to be received by the host computer.

71. A method implemented in a communication system including a host computer, a base station, and a User Equipment, UE, the method comprising:
at the host computer, receiving, from the base station, user data originating from a transmission which the base station has received from the UE, wherein the UE performs any of the steps of any of the Group A embodiments.

72. The method of the previous embodiment, further comprising at the base station, receiving the user data from the UE.

73. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
AL Aggregation Level
AN Access Network
AP Access Point
ASIC Application Specific Integrated Circuit
AUSF Authentication Server Function
BCCH Broadcast Control Channel
BCH Broadcast Channel
BLER Block Error Rate
BS Base Station
CCCH Common Control Channel
CE Coverage Enhancement
CPU Central Processing Unit
CRC Cyclic Redundancy Check
C-RNTI Cell Radio Network Temporary Identifier
CRS Cell Specific Reference Signal
CSI Channel State Information
CSI-RS Channel State Information Reference Signal
CSS Common Search Space
DCI Downlink Control Information
DL Downlink
DM Demodulation
DMRS Demodulation Reference Signal
DN Data Network
DSP Digital Signal Processor
ECCE Enhanced Control Channel Elements
eMTC Enhanced Machine-Type Communication
eNB Enhanced or Evolved Node B
ePDCCH Enhanced Physical Downlink Control Channel
FPGA Field Programmable Gate Array
GHz Gigahertz
gNB New Radio Base Station
HARQ Hybrid Automatic Repeat Request
IoT Internet of Things
IP Internet Protocol
LTE Long Term Evolution
M2M Machine-to-Machine
MIMO Multiple Input Multiple Output
MME Mobility Management Entity
MMSE Minimizing a Mean Squared Error
MPDCCH MTC Physical Downlink Control Channel
MTC Machine Type Communication
NB-IoT Narrowband Internet of Things
NR New Radio
OFDM Orthogonal Frequency Division Multiplexing
OFDMA Orthogonal Frequency Division Multiple Access
OTT Over-the-Top
PBCH Physical Broadcast Channel
PDCCH Physical Downlink Control Channel
PDSCH Physical Downlink Shared Channel
P-GW Packet Data Network Gateway
PMI Precoder Matrix Indicator
PRB Physical Resource Block
PSS Primary Synchronization Signal
PUCCH Physical Uplink Control Channel
PUSCH Physical Uplink Shared Channel
RAM Random Access Memory
RAN Radio Access Network
RAT Radio Access Technology
RB Resource Block
RE Resource Element
RF Radio Frequency
RNTI Radio Network Temporary Identifier
ROM Read Only Memory
RRC Radio Resource Control
RRH Remote Radio Head
RRM Radio Resource Management
RRU Remote Radio Unit
RS Reference Signal
RTT Round Trip Time
RX Receiver
SCEF Service Capability Exposure Function
S-GW Serving Gateway
SNR Signal to Noise Ratio
SSS Secondary Synchronization Signal
TX Transmitter
UE User Equipment
UL Uplink
USB Universal Serial Bus
USS UE Specific Search Space Those skilled in the art will recognize improvements and modifications to the embodiments of the present disclosure. All such improvements and modifications are considered within the scope of the concepts disclosed herein.

What is claimed is:
1. A method performed by a wireless device for decoding a transmission, the method comprising:

determining a plurality of Machine-Type Communications, MTC, Physical Downlink Control Channel, MPDCCH, transmission candidates to monitor;

for at least one candidate of the plurality of MPDCCH transmission candidates, determining whether the candidate belongs to a first group of candidates or a second group of candidates where the first group of candidates comprises a first subset of a first search space and the second group of candidates comprises the combination of a second search space and a second subset of the first search space, where the second subset is a complement of the first subset and the first search space comprises a User Equipment, UE,-specific search space and the second search space comprises a Type 0-MPDCCH common search space;

if the candidate belongs to the first group of candidates, attempting to decode the MPDCCH transmission using a Channel State Information, CSI,-based precoding scheme; and if the candidate belongs to the second group of candidates, attempting to decode the MPDCCH transmission using a predetermined precoding scheme.

2. The method of claim 1 wherein the predetermined precoding scheme is chosen from the group consisting of:
selecting a precoder based on precoder cycling; and
selecting a fixed precoder.

3. The method of claim 1 wherein determining whether the candidate belongs to the first group of candidates or the second group of candidates is based on an aggregation level of a control channel candidate.

4. The method of claim 1 wherein determining whether the candidate belongs to the first group of candidates or the second group of candidates is based on one or more of the group consisting of:
An aggregation level of a control channel candidate;
an index identifying the control channel candidate for an aggregation level within the search space;
a time repetition factor of the control channel candidate;
a sequential index identifying a starting subframe of the control channel candidate for a given repetition factor;
a time index identifying a time reference of the control channel candidate;
a time index identifying a time reference of the search space; and
a number of physical resource blocks used for monitoring control channel candidates within the search space.

5. The method of claim 1 wherein using a CSI-based precoding scheme comprises using a single precoding matrix to be used for all physical resource blocks used for transmitting a control channel candidate.

6. The method of claim 1 wherein using a CSI-based precoding scheme comprises using a plurality of precoding matrices, each precoding matrix to be used for a subset of physical resource blocks used for transmitting a control channel candidate.

7. The method of claim 1 wherein using a predetermined precoding scheme comprises using a plurality of precoding matrices when the precoding technique is based on precoder cycling.

8. The method of claim 1 wherein using a CSI-based precoding scheme comprises using a precoder based on channel state information sent by the wireless device.

9. The method of any of claim 8 wherein the channel state information comprises a Precoding Matrix Indicator, PMI.

10. The method of claim 1 further comprising:
using the determined precoder being used in a Physical Resource Block, PRB, pair for obtaining channel estimates associated with antenna ports used for transmission in the PRB pair by performing channel estimation based on a combination of the Demodulation Reference Signal, DM-RS, located in the PRB pair and at least one of the DM-RS located in one or more other PRB pairs, and Cell Specific Reference Signal, CRS, located in any set of PRB pairs.

11. The method of claim 1 further comprising:
using the determined precoder being used in a PRB pair for obtaining channel estimates associated with antenna ports used for transmission in another PRB pair by performing channel estimation based on a combination of the DM-RS located in the PRB pair and at least one of the DM-RS located in one or more other PRB pairs, and CRS located in any set of PRB pairs.

12. The method of claim 1 further comprising:
using the determined precoder being used in a PRB pair for obtaining channel estimates associated with antenna ports used for transmission in the PRB pair by performing channel estimation based on CRS located in any set of PRB pairs.

13. The method of claim 10 further comprising:
using the obtained channel estimates associated with the antenna ports used for transmission in one or more PRB pair to demodulate information received in the PRB pairs.

14. A method performed by a base station for encoding a transmission, the method comprising:
determining whether to encode a Machine-Type Communications, MTC, Physical Downlink Control Channel, MPDCCH, transmission to a wireless device using a Channel State Information, CSI,-based precoding scheme or a predetermined precoding scheme;
if using the CSI-based precoding scheme, choosing a candidate for transmission from a first group of candidates where the first group of candidates comprises a first subset of a first search space and the first search space comprises a User Equipment, UE,-specific search space;
if using the predetermined precoding scheme, choosing a candidate for transmission from a second group of candidates where the second group of candidates comprises the combination of a second search space and a second subset of the first search space, where the second subset is a complement of the first subset and the second search space comprises a Type 0-MPDCCH common search space.

15. The method of claim 14 further comprising:
if a CSI has not been received from the wireless device or if a CSI received from the wireless device is deemed not to be reliable, determining to encode the transmission to the wireless device using the predetermined precoding scheme.

16. The method of claim 14 wherein the predetermined precoding scheme is chosen from the group consisting of:
selecting a precoder based on precoder cycling; and
selecting a fixed precoder.

17. The method of claim 14 wherein determining whether to encode the MPDCCH transmission to the wireless device using a CSI-based precoding scheme or a predetermined precoding scheme is based on an aggregation level of a control channel candidate.

18. The method of claim 14 wherein determining whether to encode the MPDCCH transmission to the wireless device using a CSI-based precoding scheme or a predetermined precoding scheme is based on one or more of the group consisting of:

an aggregation level of a control channel candidate;
an index identifying the control channel candidate for an aggregation level within the search space;
a time repetition factor of the control channel candidate;
a sequential index identifying a starting subframe of the control channel candidate for a given repetition factor;
a time index identifying a time reference of the control channel candidate;
a time index identifying a time reference of the search space; and
a number of physical resource blocks used for monitoring control channel candidates within the search space.

19. The method of claim 14 wherein using a CSI-based precoding scheme comprises using a single precoding matrix to be used for all physical resource blocks used for transmitting a control channel candidate.

20. The method of claim 14 wherein using a CSI-based precoding scheme comprises using a plurality of precoding matrices, each precoding matrix to be used for a subset of physical resource blocks used for transmitting a control channel candidate.

21. The method of claim 14 wherein frequency hopping between at least two different narrowbands is employed, and one precoding scheme is used in one of the narrowbands and a different precoding scheme is used in at least one other narrowband.

22. The method of claim 14 wherein using a predetermined precoding scheme comprises using a plurality of precoding matrices when the precoding technique is based on precoder cycling.

23. The method of claim 14 wherein using a CSI-based precoding scheme comprises using a precoder based on channel state information sent by the wireless device.

24. The method of claim 21 wherein a CSI comprises a Precoding Matrix Indicator, PMI.

25. A wireless device for decoding a transmission, the wireless device comprising:
one or more processors; and
memory comprising instructions to cause the wireless device to:
determine a plurality of Machine-Type Communications, MTC, Physical Downlink Control Channel, MPDCCH, transmission candidates to monitor;
for at least one candidate of the plurality of MPDCCH transmission candidates, determine whether the candidate belongs to a first group of candidates or a second group of candidates where the first group of candidates comprises a first subset of a first search space and the second group of candidates comprises the combination of a second search space and a second subset of the first search space, where the second subset is a complement of the first subset and the first search space comprises a User Equipment, UE,-specific search space and the second search space comprises a Type 0-MPDCCH common search space;
if the candidate belongs to the first group of candidates, attempt to decode the MPDCCH transmission using a Channel State Information, CSI,-based precoding scheme; and
if the candidate belongs to the second group of candidates, attempt to decode the MPDCCH transmission using a predetermined precoding scheme.

26. The wireless device of claim 25 wherein the predetermined precoding scheme is chosen from the group consisting of:
selecting a precoder based on precoder cycling; and
selecting a fixed precoder.

27. A base station for encoding a transmission, the base station comprising:
one or more processors; and
memory comprising instructions to cause the translator node to:
determine whether to encode a Machine-Type Communications, MTC, Physical Downlink Control Channel, MPDCCH, transmission to a wireless device using a Channel State Information, CSI,-based precoding scheme or a predetermined precoding scheme;
if using the CSI-based precoding scheme, choose a candidate for transmission from a first group of candidates where the first group of candidates comprises a first subset of a first search space and the first search space comprises a UE-specific search space;
if using the predetermined precoding scheme, choose a candidate for transmission from a second group of candidates where the second group of candidates comprises the combination of a second search space and a second subset of the first search space, where the second subset is a complement of the first subset and the second search space comprises a Type 0-MPDCCH common search space.

28. The base station of claim 27 wherein if a CSI has not been received from the wireless device or if a CSI received from the wireless device is deemed not to be reliable, determining to encode the transmission to the wireless device using the predetermined precoding scheme.

* * * * *